US009180322B2

United States Patent
Wettlaufer et al.

(10) Patent No.: US 9,180,322 B2
(45) Date of Patent: *Nov. 10, 2015

(54) PORTABLE RESCUE TOOL AND METHOD OF USE

(71) Applicant: Altair Engineering, Inc., Troy, MI (US)

(72) Inventors: Edward Wettlaufer, St. Clair Shores, MI (US); James Trumble, Royal Oak, MI (US); Timothy R. Smith, Commerce Township, MI (US); Shaun C. Muston, Brownstown, MI (US); Dragi Gasevski, West Bloomfield, MI (US); Craig Mackiewicz, Clawson, MI (US)

(73) Assignee: ALTAIR ENGINEERING, INC., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,676

(22) Filed: Aug. 11, 2014

(65) Prior Publication Data

US 2015/0028276 A1    Jan. 29, 2015

Related U.S. Application Data

(63) Continuation of application No. 13/026,510, filed on Feb. 14, 2011, now Pat. No. 8,800,343.

(60) Provisional application No. 61/304,536, filed on Feb. 15, 2010.

(51) Int. Cl.
*A62B 3/00* (2006.01)
*B23D 15/14* (2006.01)
(Continued)

(52) U.S. Cl.
CPC ............... *A62B 3/005* (2013.01); *B23D 15/14* (2013.01); *B23D 29/00* (2013.01); *B25F 5/005* (2013.01)

(58) Field of Classification Search
CPC ....... A62B 3/005; Y10S 72/705; B23D 15/14; B23D 29/00; B25F 5/005
See application file for complete search history.

(56) References Cited

U.S. PATENT DOCUMENTS 3,819,153 A * 6/1974 Hurst et al. ............... 254/93 R
4,522,054 A * 6/1985 Wilson et al. ............... 72/392

(Continued)

FOREIGN PATENT DOCUMENTS

JP          3117523 U    1/2006
KR       200232117 Y1   7/2001

(Continued)

OTHER PUBLICATIONS

Notice of Transmittal, International Search Report and Written Opinion of the International Searching Authority dated Jan. 2, 2012 from the corresponding International Application No. PCT/US2011/024701.

(Continued)

*Primary Examiner* — Teresa M Ekiert
(74) *Attorney, Agent, or Firm* — Young, Basile, Hanlon & MacFarlane, P.C.

(57) ABSTRACT

A portable, hand-operated rescue tool is provided for rescue and extreme duty operations where an object needs to be cut, crushed, pierced and separated, or lifted. The rescue tool includes a body, a support handle and articulating jaw force members used to impart high forces on an object. The tool includes a manually-operated, pivoting actuation handle connected to a high pressure fluid displacement system to pivotally rotate the jaw force arms in a selected direction or mode of operation to suit the situation.

20 Claims, 23 Drawing Sheets

(51) Int. Cl.
*B23D 29/00* (2006.01)
*B25F 5/00* (2006.01)

(56) References Cited

U.S. PATENT DOCUMENTS

| | | | |
|---|---|---|---|
| 6,000,680 | A | 12/1999 | Kimura et al. |
| 6,179,001 | B1 | 1/2001 | Schutz |
| 6,244,568 | B1 * | 6/2001 | Patton .................. 254/93 R |
| 6,578,821 | B2 | 6/2003 | Lasaroff et al. |
| 6,634,173 | B2 | 10/2003 | Linster et al. |
| 6,942,468 | B2 | 9/2005 | Sauerbier et al. |
| D523,314 | S | 6/2006 | Kimura |
| 7,107,812 | B1 | 9/2006 | Patton et al. |
| 7,219,526 | B2 | 5/2007 | Herod |
| 7,234,683 | B2 | 6/2007 | Schutz |
| 7,240,490 | B2 | 7/2007 | Baumuller et al. |
| 7,409,828 | B2 | 8/2008 | Bertleff |
| 7,568,372 | B1 * | 8/2009 | Patton et al. ................ 72/464 |
| 8,322,551 | B2 | 12/2012 | Ramoo et al. |
| 2007/0033984 | A1 | 2/2007 | Goop |
| 2007/0289645 | A1 | 12/2007 | Schutz |
| 2009/0045384 | A1 | 2/2009 | Jacobs |
| 2010/0025647 | A1 | 2/2010 | Strohmeier |

FOREIGN PATENT DOCUMENTS

| | | |
|---|---|---|
| NL | 1014253 C2 | 8/2001 |
| RU | 2183552 C2 | 6/2002 |

OTHER PUBLICATIONS

Hurst Jaws, Products ML-16C and ML-16S, www.hurstjaws.com, 2003.
Holmatro Rescue Equipment, Products HCT 3120, http://products.holmatro-usa.com,2003.

* cited by examiner

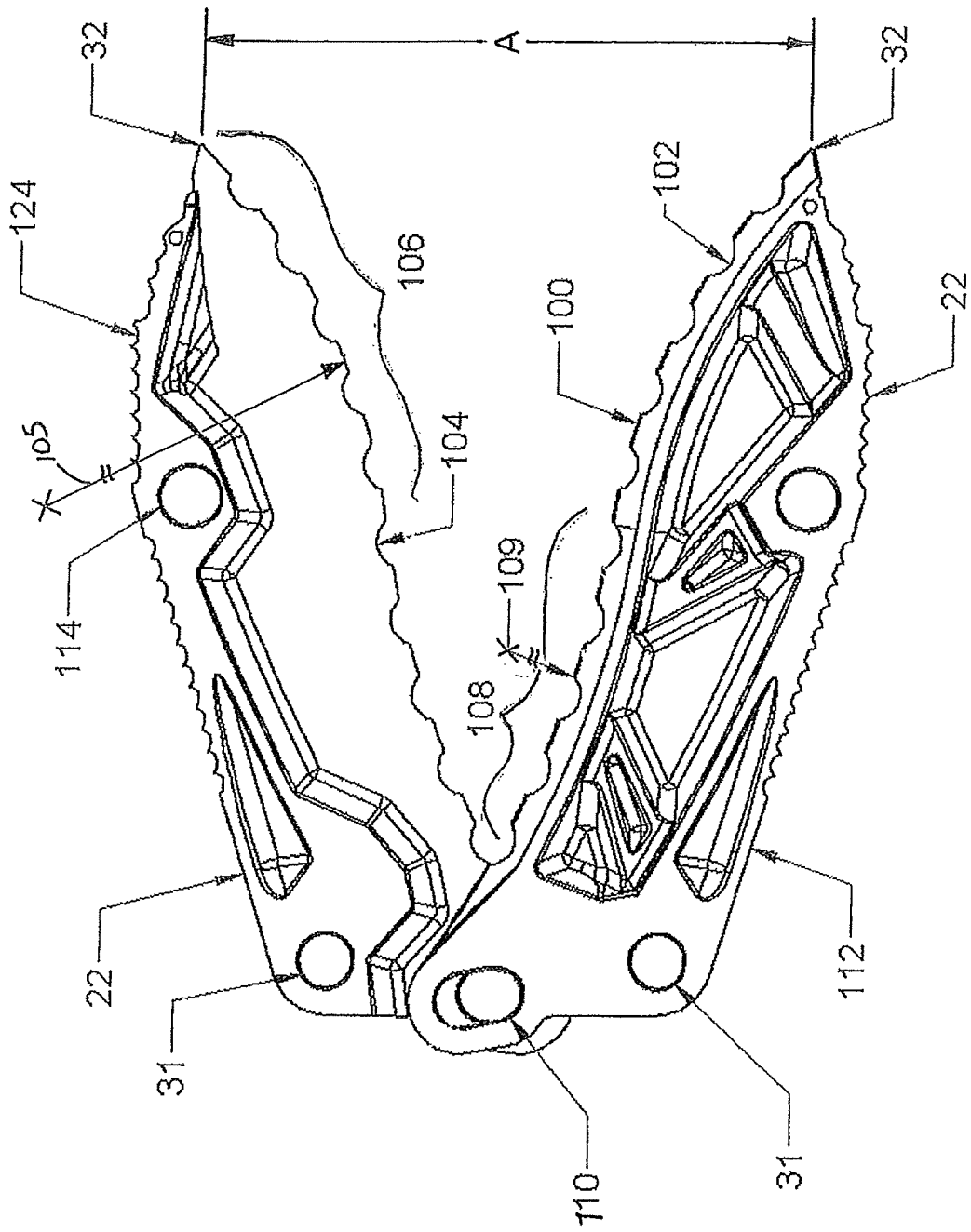

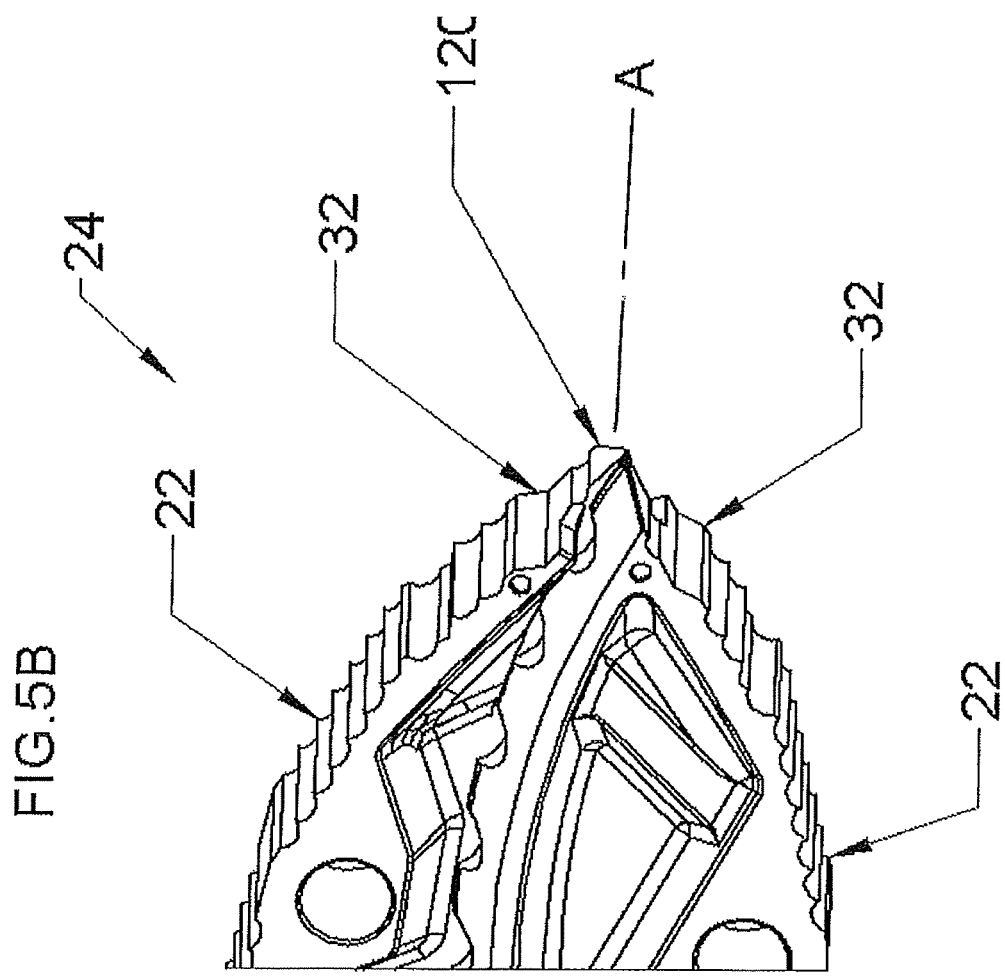

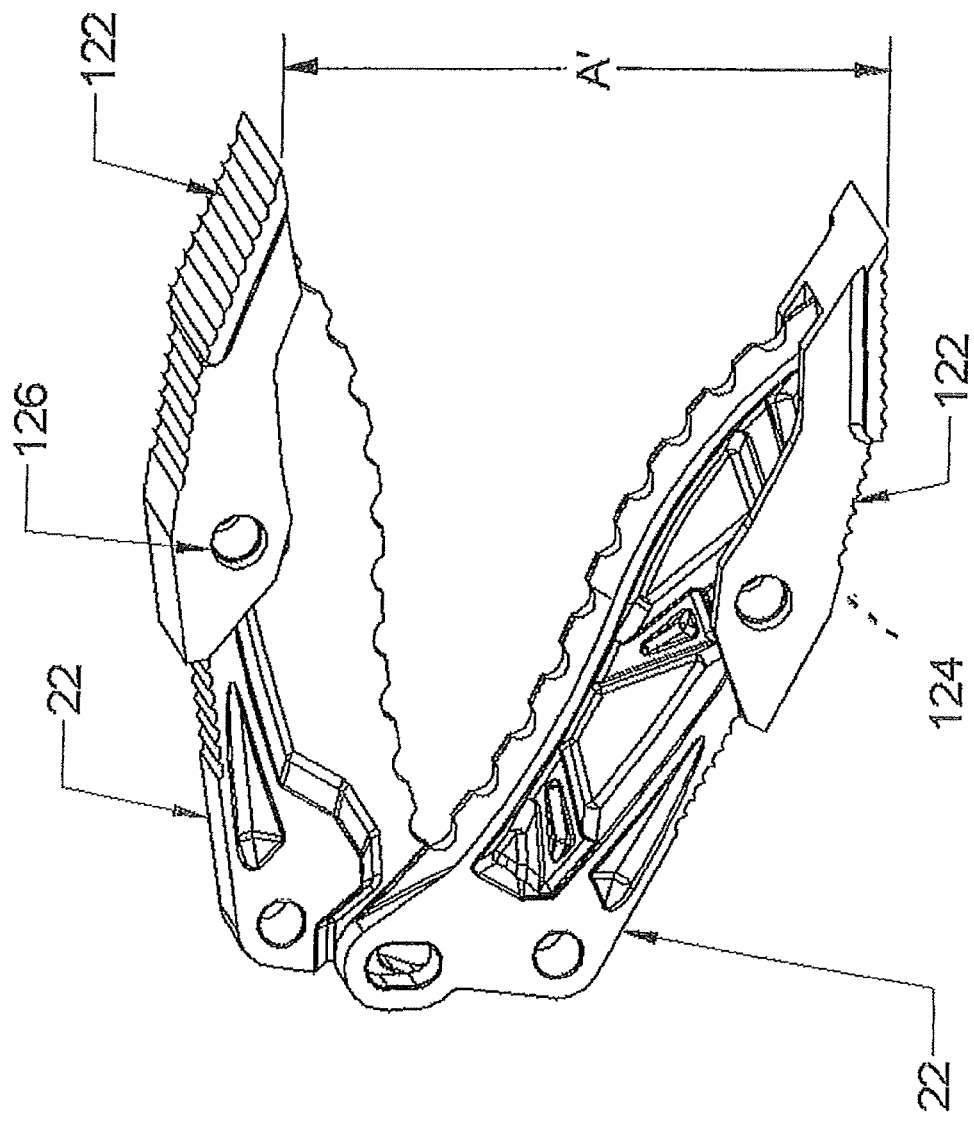

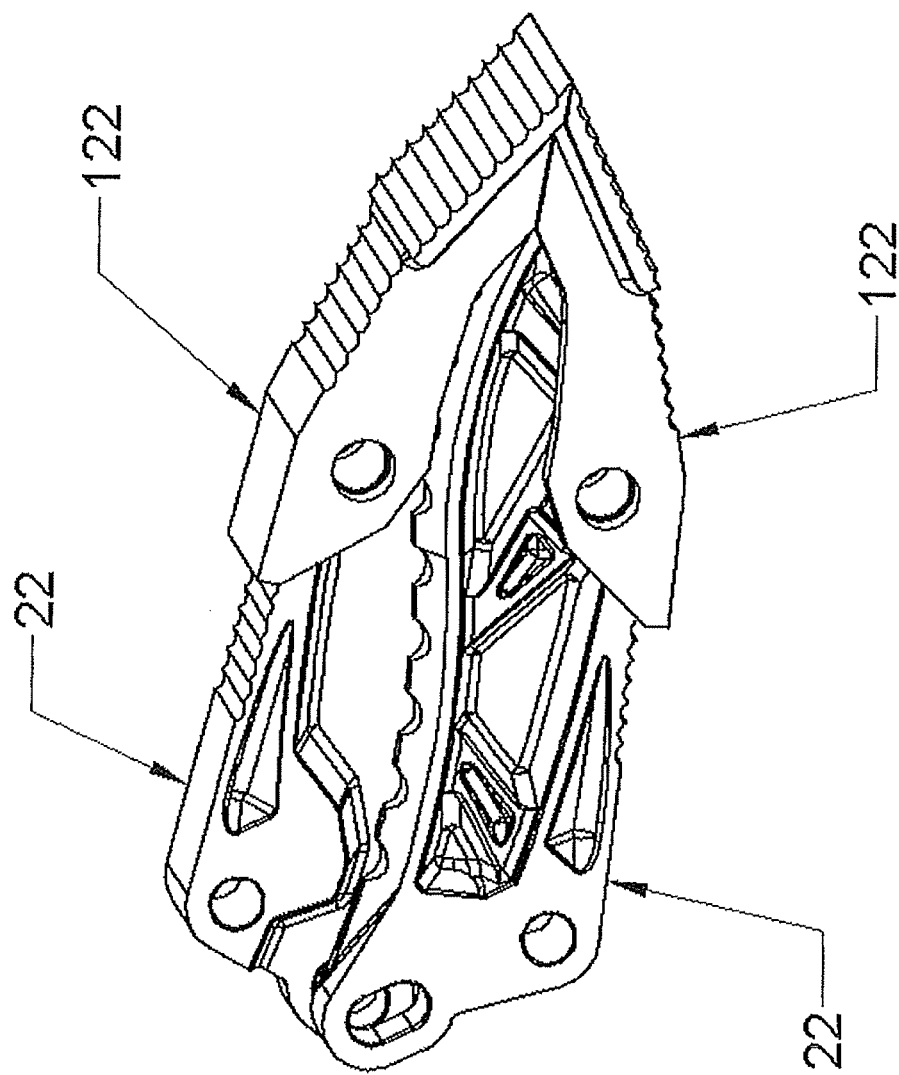

PORTABLE RESCUE TOOL AND METHOD OF USE

CROSS-REFERENCE TO RELATED APPLICATIONS

This application is a continuation of U.S. patent application Ser. No. 13/026,510 filed Feb. 14, 2011, which claims priority benefit to U.S. Provisional Patent Application No. 61/304,536 filed Feb. 15, 2010, both of which are incorporated herein by reference in their entirety.

STATEMENT REGARDING FEDERALLY SPONSORED RESEARCH OR DEVELOPMENT

This invention was made with government support under contract. The government has certain rights in the invention.

FIELD OF INVENTION

The present invention generally relates to the field of portable, hand-held tools. The present invention has particular, but not exclusive, utility in emergency or rescue operations.

BACKGROUND

Portable rescue tools are commonly used in emergency situations such as, for example, a vehicle accident or a fire. Such rescue tools have included a pair of arms that are mounted on an end of a hydraulic cylinder. The arms cooperate to create a jaw that, depending on the situation, is used to either forcibly separate or crush and cut through parts of a vehicle or a building. In other applications, the tool can be used as a lifting mechanism with one arm placed in contact with the ground or other firm support surface. In an arm separating mode, the arms of the jaws are first closed and then wedged into a small space. As the arms are spread open, the material around the jaws separates to create a larger opening. In a cutting mode, the arms close to cut through metal during rescue operations.

SUMMARY

A hand-held rescue tool is provided including a main body and a pair of force arms that cooperate with one another to create a jaw. The arms are progressively and incrementally articulated through cyclical, back-and-forth rotation of an actuation handle which operates a high pressure fluid pump inside the main body of the tool.

In one example, the main body further includes a rotatably adjustable front handle used to vertically support and maneuver the tool into an operating position. The front handle is selectively rotatable about the exterior surface of the main body to adjust the position of the front handle to maximize access and freedom of movement of the actuation handle to actuate the force arms. In a preferred example, the front handle includes push pins which selectively lock and unlock the handle from the main body to allow rotation relative to the main body, or lock the position of the front handle with respect to the body.

In one example, a toggle dial is positioned on the exterior of the tool main body to select whether the force arms are in a mode to forcibly open or close. In a preferred example, the toggle dial is easy to grasp and includes highly visible indicators.

In one example, the main body houses a hydraulic fluid displacement system including a variable hydraulic drive through use of high and low fluid volume pistons and a biasing member connected to the actuating handle. In an alternate fluid displacement system, dual fluid chambers are used with a large moving piston, a fixed smaller piston and a bladder-type fluid reservoir. The internal control valves and fluid passageways are oversized to reduce the amount of internal forces and friction to keep actuating handle efforts low.

In one example, exterior indicators on key structural points include high visibility markings which may be seen during the day and at night through night vision equipment to assist in rapid placement and operation of the tool under dangerous conditions.

BRIEF DESCRIPTION OF THE DRAWINGS

The description herein makes reference to the accompanying drawings wherein like reference numerals refer to like parts throughout the several views, and wherein:

FIG. 5A is a side view of an example of a pair of force arms of the rescue tool, where FIG. 5A illustrates the jaw in a partially open position;

FIG. 5B is an enlarged perspective view of the exemplary arms in FIG. 5A showing the arm ends in a closed position;

FIGS. 6A-6B are perspective views of the jaws in FIG. 5A with an exemplary set of jaw extenders, where FIG. 6A shows the jaw in a partially open position and FIG. 6B in the closed position;

DETAILED DESCRIPTION OF EMBODIMENTS OF THE INVENTION

Several examples of a rescue tool and description of methods of use are shown in FIGS. 1-20.

Figure 1:
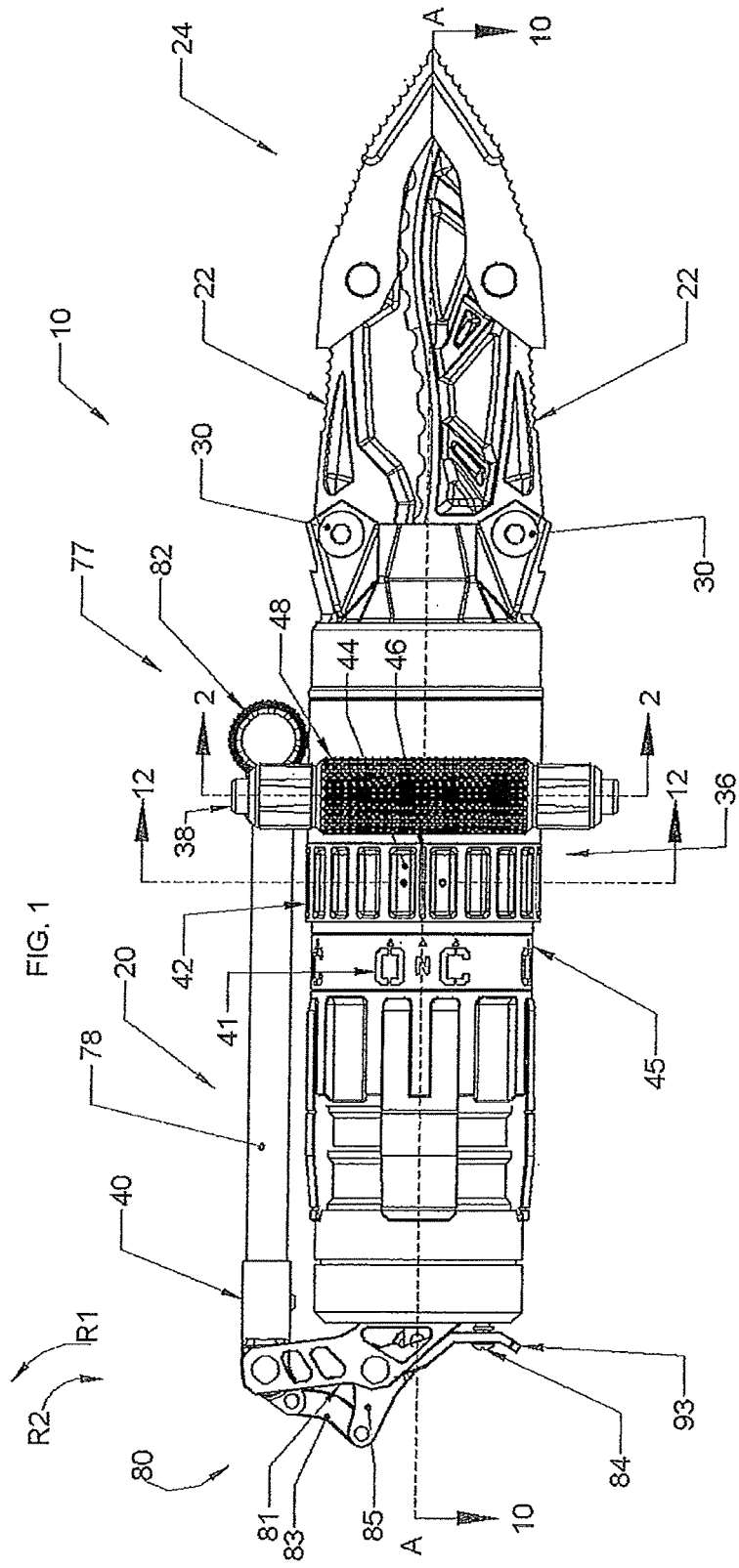
FIG. 1 is a side view of an exemplary rescue tool including a main body and a pair of force arms.

Referring to FIG. 1, a first example of a hand-held, manually operable, portable hydraulic rescue tool is indicated by reference number 10. The rescue tool 10 includes a main body 20 and a pair of force arms 22 that cooperate with one another to create a jaw 24. The main body 20 provides high pressure, fluid power or force to actuate each of the arms 22 about respective pivot pins 30. The arms 22 rotatably move in generally opposing directions about the pins 30, where the jaw 24 is opened as each of the ends 32 of the arms 22 move away from one another. FIG. 1 illustrates the jaw 24 in a closed position, and FIG. 3, for example, illustrates the jaw 24 in an open position where the arms 22 are spread apart. The arms 22 are constructed from a high strength material that can withstand forces typically experienced by the jaw 24 when separating parts of a vehicle or a building such as, for example, an alloy steel, stainless steel or high strength aluminum. Where softer and lighter base materials are used, harder and more durable alloy, stainless steel or carbide inserts may be used in critical areas. Other materials and combinations thereof known by those skilled in the art may be used. The main body 20 is illustrated as an elongated generally cylindrical chamber that contains a fluid displacement system 130 (FIG. 7) for actuating the jaw 24. The main body 20 can be made from high strength, lightweight materials such as aircraft grade aluminum, steel, composites and other materials known by those skilled in the art. The exterior of body 20 may have other features such as molded or cast in formations and elastomer or polymer coverings or inserts to aid in the secure grip or handling of the tool 10. In one example (not shown) an elastomeric urethane cover is used over much of the body exterior for a secure grip and protection of the body and interior components from impacts and abrasions.

In the first example shown, the main body 20 exterior includes a digit actuated toggle switch or dial 36, a rotatable front handle 38, and a rotatable rear or actuating handle 40. The toggle dial or switch 36 allows a user to select a mode of operation, for example, whether actuation of the rear handle will cause the jaw to open, close or remain locked in place.

The exemplary toggle dial 36 includes three actuation positions 41 including, an open position "O", a neutral position "N" and a close position "C", which are all labeled on an exterior surface 45 of the main body 20. In the embodiment as illustrated, the three actuation positions or modes of operation 41 are labeled at three circumferentially located positions around the main body 20 and are each spaced about ninety degrees (90°) apart. Preferably, the three actuation positions and mode markers 46 are used and are positioned about ninety degrees (90°) apart. However, it is understood that the three actuation positions 41 may be spaced at other circumferential intervals as well such as, for example, one hundred and twenty degrees (120°) or other positions known by those skilled in the field. The O, N and C positions may be utilized in a greater or lesser number about body 20.

The toggle dial 36 also includes a selectively rotatable ring 42 that includes a textured outer profile including a series of indentions 44 and an actuation mode marker 46. The indentations 44 provide a surface that is easier for a user to positively grasp than a smooth surface, for example with heavy gloves or protective armor. The mode marker 46 aligns with one of the open position "O", the neutral position "N" and the close position "C" to indicate the position, or mode of operation of the hydraulic system. For example, if the mode marker 46 is aligned with the first mode of operation to open position "O", the jaw 24 is capable of actuation to open or spread jaw 24 apart. If the mode marker 46 is aligned in a second mode of operation in the close position "C", the jaw 24 is capable of actuation to close or move arms 22 angularly toward each other. If the mode marker 46 is aligned in a third mode of operation in the neutral position N, the jaw 24 is locked from further movement even if the rear handle 40 is further actuated or cycled. Other toggle systems, for example a switch lever (not shown), and other mode markers 46 known by those skilled in the field may be used.

Figure 2:
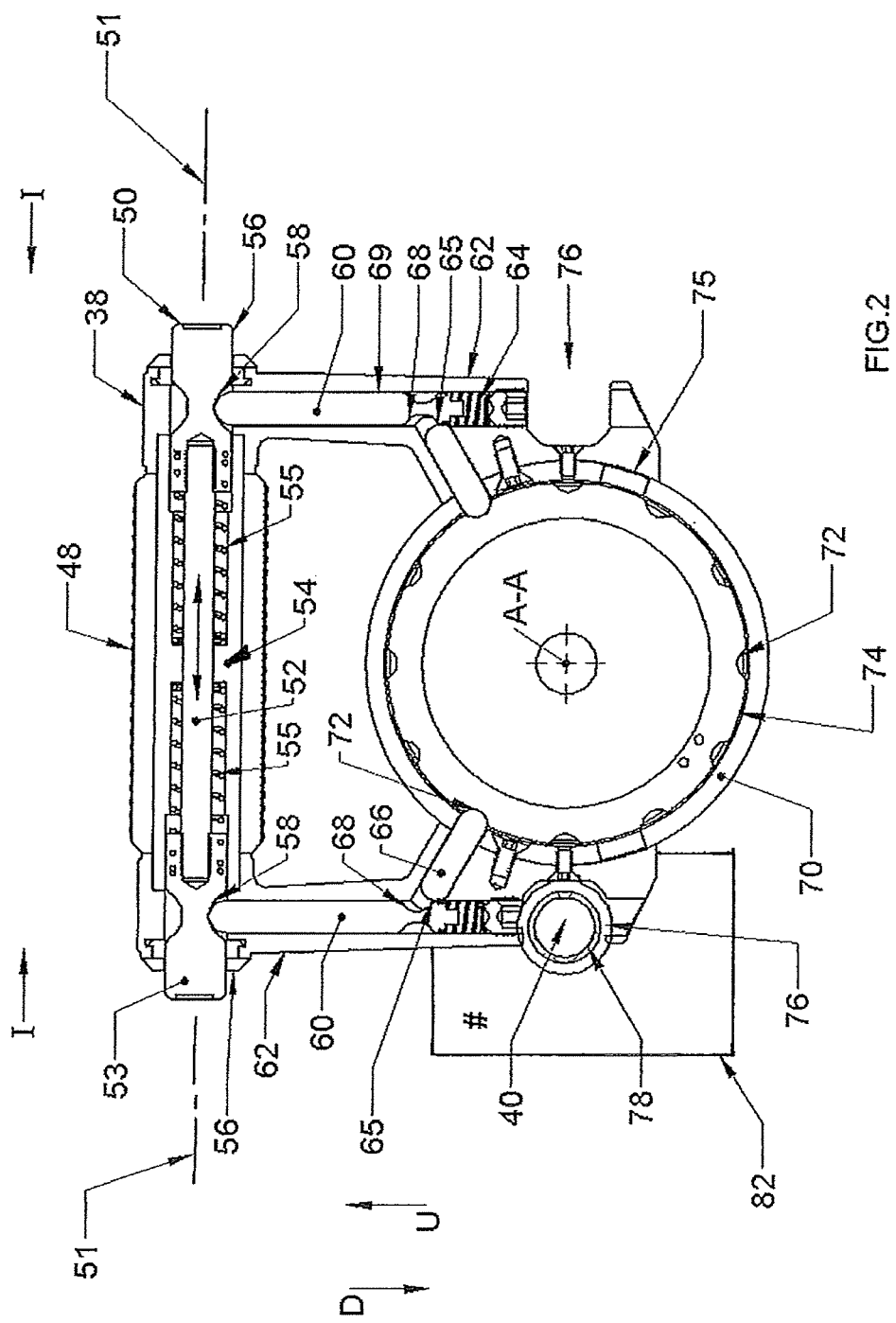
FIG. 2 is a cross sectional view of the main body taken along section line 2-2 of FIG. 1.

Referring to FIG. 2, an example of a rescue tool front or support handle 38 that is selectively rotatable and lockingly engagable with the rescue tool body 20. In the example in FIG. 2, the support handle 38 is shown in an engaged position which does not allow free rotation of handle 38 about a longitudinal axis A-A circumferentially about body 20. Front handle 38 can include a hand grip 48 having an exemplary knurled portion for a sure, positive grip by a user. In the example shown, front handle 38 includes an exemplary locking device including an elongate button 50 having opposing ends 53 connected by a rod 52 positioned inside a housing 54 positioned along an axis 51 as generally shown. Each button end 53 includes a recess 58 preferably about a circumference of button 50. A resilient member 55, shown in the exemplary form of two compression springs, is positioned inside the housing 54 to normally bias rod 52 and both ends 53 to an axial position along axis 51 such that the pins 60 are in an upward position in the direction "U" so that pins 60 are positioned in recesses 58 as shown. In such normally biased position, front handle 38 is firmly locked from rotation about axis A-A as further described below.

In the example illustrated in FIG. 2, handle 38 includes a pair of elongate pins 60 positioned in bores 69 in the side arms 62 of handle 38. Each handle side arm 62 further includes a biasing member 64, shown in the form of a compression spring, that normally biases each pin 60 in an upward direction "U" so that the end of each pin 60 is positioned in respective recesses 58 of the respective button end 53. In the example, each pin 60 includes a recess 68 about its circumference and a radial abutment 65 as generally shown. Handle 38 further includes a pair of locking members 66 angularly positioned relative to the pins 60 as generally shown. As shown in FIG. 2, where handle 38 is in a position where it is engaged with body 20, that is, handle 38 is locked and not permitted to rotate circumferentially about body 20, pin members 66 are biased upwardly in a direction "U" which forces pin 66 abutment 65 to frictionally and contact locking members 66 and forcibly drive locking members downwardly and into indentations 72 in periphery receptacle 74 as illustrated thereby preventing ring 70 and handle 38 from rotation about axis A-A and body 20. Handle 38 remains in this locked and circumferential position until button 50 is axially moved as described below.

If it is desired to change the circumferential position of handle 38, button 50 is axially moved against the force of biasing member 55 (not shown). On sufficient axial movement of button 50, pins 60 are forcibly dislodged from recesses 58 thereby driving pins 60 downward in direction "D" until locking members 66 are permitted to enter into pin recesses 68 thereby disengaging locking members 66 from indentations 72. In this position, handle 38 is free to rotate about the longitudinal axis A-A circumferentially about body 20. In a preferred example, biasing member 55 is designed to return button 50 back to a normally biased position where pins 60 are driven upward by biasing member 64 raising abutments 65 to forcibly drive locking members 66 back into indentations 72 locking the handle 38 in place.

A ring 70 is located on the outer surface of the main body 20 and supports the handle side arms 62 through common fasteners. Ring 70 is used to rotate the support handle 38 about axis A-A. The indentations 72 are formed in the body 20 periphery 74 radially inward of ring 70. In the embodiment as illustrated, the indentations 72 are equally spaced at about thirty degrees apart (30°), however it is understood that other indentation configurations may be used as well.

In the example shown in FIG. 2, the support handle 38 includes two receptacles 75 positioned on opposite sides of the ring 70. Each receptacle 75 includes an open slot 76 for use to receive and engage actuating handle 40. Specifically, the slots 76 are sized to receive and secure an extending or elongate member or arm 78 of the actuating handle 40, which allows for the rescue tool 10 to be stored compactly. In an alternate example not shown, support handle 38 side arms 62 may be telescopic or extendible radially outward from axis A-A to increase the height of the handle or decrease it to suit the particular situation and for compact storage. Support handle 38 including side arms 62 and receptacles 75 may be made from the same materials as body 20. It is understood that support handle 38 may include a single arm to connect the hand grip to the ring. It is further understood that the support handle and actuating handle may be located in positions other than as illustrated.

Figure 3:
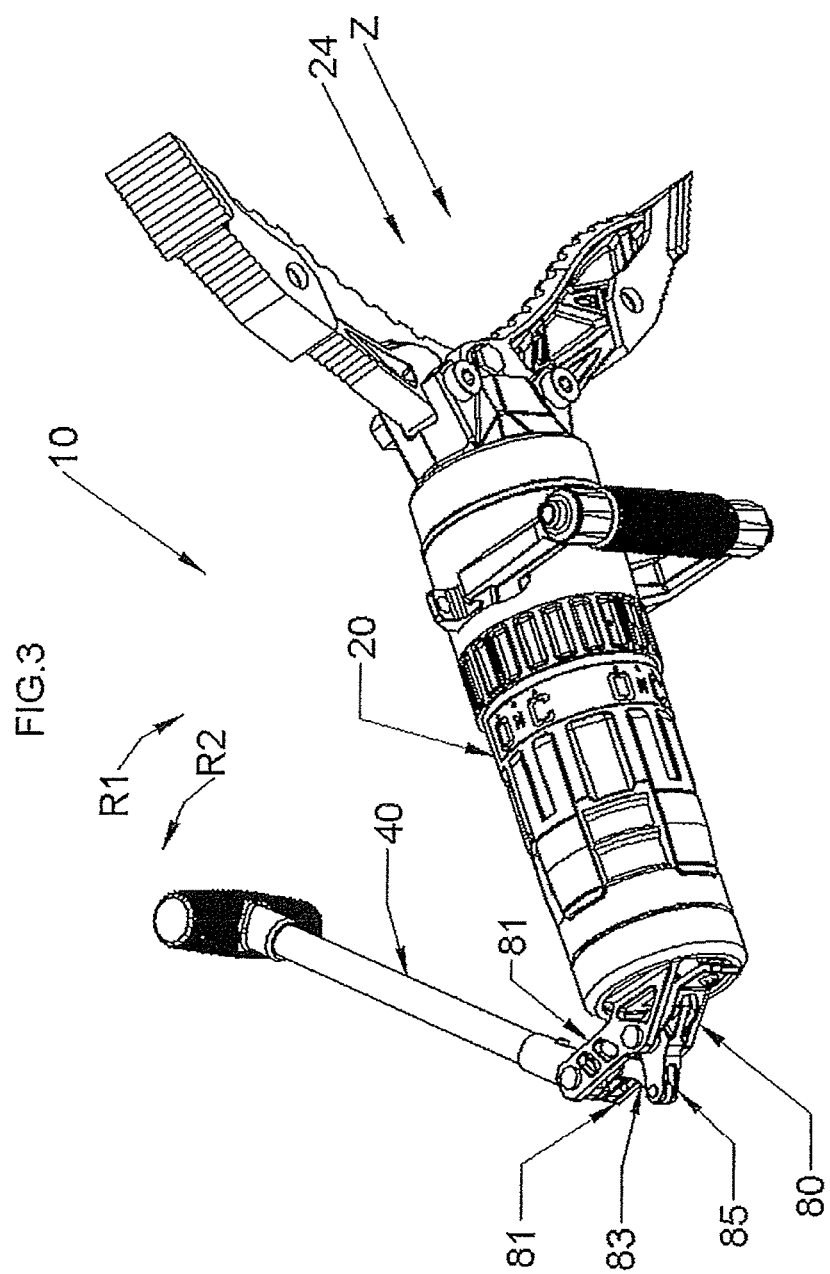
FIG. 3 is a perspective view of the rescue tool illustrated in FIG. 1 showing the jaws in a open position and the rear handle in mid-stroke.
Figure 9:
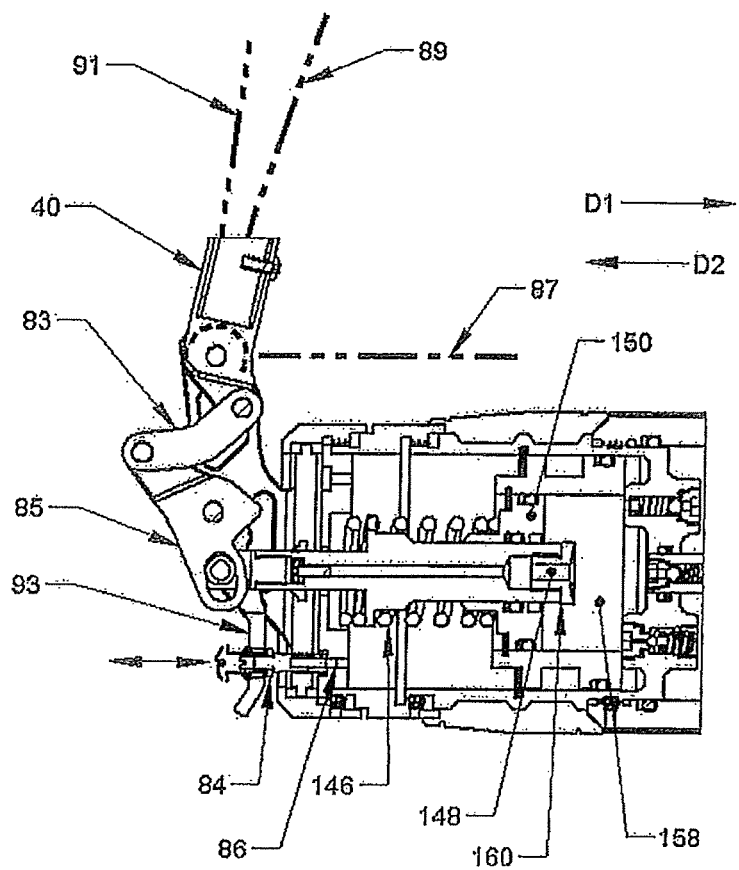
FIG. 9 is an alternate cross sectional view of FIG. 8 showing a variable hydraulic piston in a partially extended position.
Figure 14:
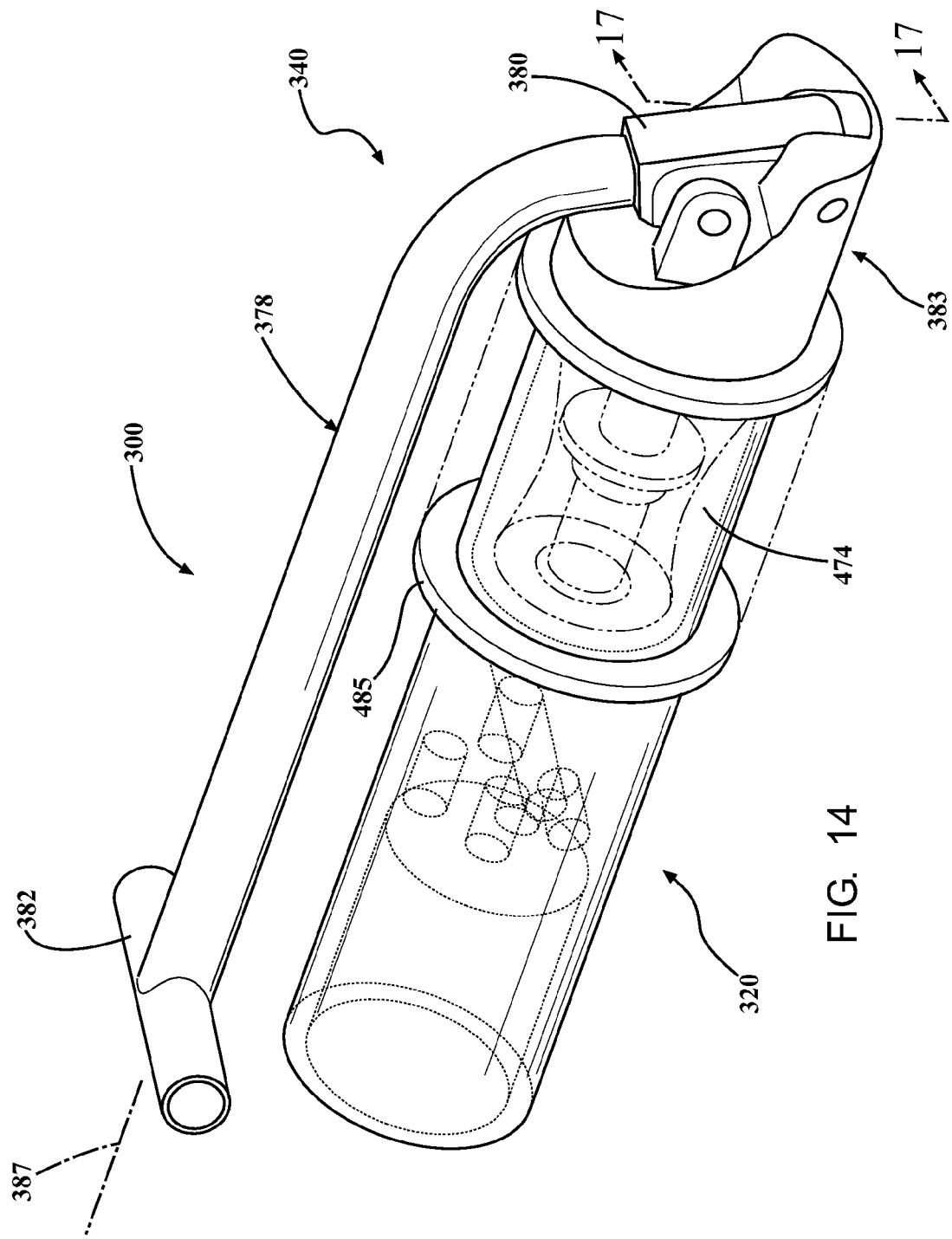
FIG. 14 is partial perspective view of an alternate example of a rescue tool shown in FIG. 1 with an alternate actuating handle, actuating handle grip portion and cam member linkage, internal piston, fluid reservoir and fluid passage system.

Referring to FIG. 1, one example of an actuating or rear handle 40 may include a hand grip 77 connected to an elongate extending arm or member 78 which is pivotally connected to linkage system 80. Actuating handle 40 can be pivotally moved back and forth through an angle or range of motion through articulation of a linkage or cam member system 80/380 in the directions R1 and R2 to actuate the jaw 24 as further described below. As best seen in FIGS. 1, 3 and 9, linkage 80 includes a pair of first links 81, a second link 83 and a third or rocker link 85 positioned and connected generally as shown. The rear handle 40 is engaged with and actuates a variable hydraulic system 130, which is described further below. Linkage system 80 may further include a fulcrum 93 and a release pin 84 described further below. A protective cover (not shown) may be removably attached to cover the linkage system 80 to protect the links from damage or debris. This cover may be completely removable, attached with a tether, or be configured so the rear handle 40 can still be actuated with the cover in place to provide a level of protection in harsh environments or prevent damage to the linkage 80 if the rescue tool is dropped etc. In an alternate example, an extension of the body as shown in FIG. 14 discussed below may be used.

The exemplary actuating handle 40 includes a grip surface 82 for a user to positively grasp while reciprocally moving the rear handle 40 back and forth in the directions R1 and R2. Although a link system 80 and a fulcrum 93 with release pin 84 is shown, other components and configurations allowing the rear handle 40 to actuate and be selectively lockingly engaged and rotatable about body 20 may be used as known by those skilled in the field. For example, see the cam member 380 shown in FIGS. 14-16 discussed further below.

In an alternate example not shown, elongate arm 78 may be axially telescopic to increase the length of actuating handle 40 for increased leverage or reduced length for compact handling and storage. Extending arm 78 may be made from the same materials as body 20. Actuating handle 40 is illustrated as being at the extreme end of body 20. It is understood that different positional locations of handle 40 with respect to body 20 may be used with required reconfiguration of the piston, fluid passageways and other structures known by those skilled in the art.

Referring to FIGS. 1, 3 and 9, in one example, the actuating handle 40, through link system 80/380, can be manipulated through a range of travel that is approximately seventy degrees (70°) in the direction R1 from a first position 87 adjacent to slot 76 to a second position 89 (FIG. 9) for actuating the jaw 24. It is understood that different ranges of travel may be used as well such as, for example, one hundred twenty (120°) or other angles of travel known by those skilled in the art.

As best seen in the example in FIG. 9, the actuating handle 40 has been actuated or articulated in the direction R1 to a second position 89 which, in the example illustrated, is about the maximum travel of the hydraulic system 130 described below. The rear handle 40 can be articulated further in the direction R1 to a third position 91. In one embodiment, the actuating handle 40 is further selectively actuated from the second position 89 to third position 91 in the direction R1 by about five degrees (5°), which causes movement of fulcrum 93 causing a release pin 84 to axially move and disengage from body 20. Specifically, referring to FIG. 9, the release pin 84 can be dislodged from a corresponding aperture 86 in body 20. Referring back to FIG. 1, once the release pin 84 is disengaged, the linkage system 80 and rear handle 40 can be rotated as a unit about the longitudinal axis A-A relative to body 20. On articulating rear handle 40 from the third position 91, back to the second position 89, release pin 84 would again engage one of a plurality of apertures 86 positioned circumferentially around body 20 to lock rear handle 40 in the desired position. Thus, in this example, a user can selectively rotate the support handle 38 about the longitudinal axis A-A, and can also selectively and independently rotate the actuating handle 40 about the longitudinal axis A-A. Allowing the support and actuating handles 38, 40 to selectively and independently rotate about the axis A-A allows a user to orient the jaw 24 in a desired position while adjusting the support 38 and actuating handle 40 to maximize a firm grip on front handle 38 and the range of motion to articulate actuating handle 40 to forcibly move jaws 24.

Figure 4:
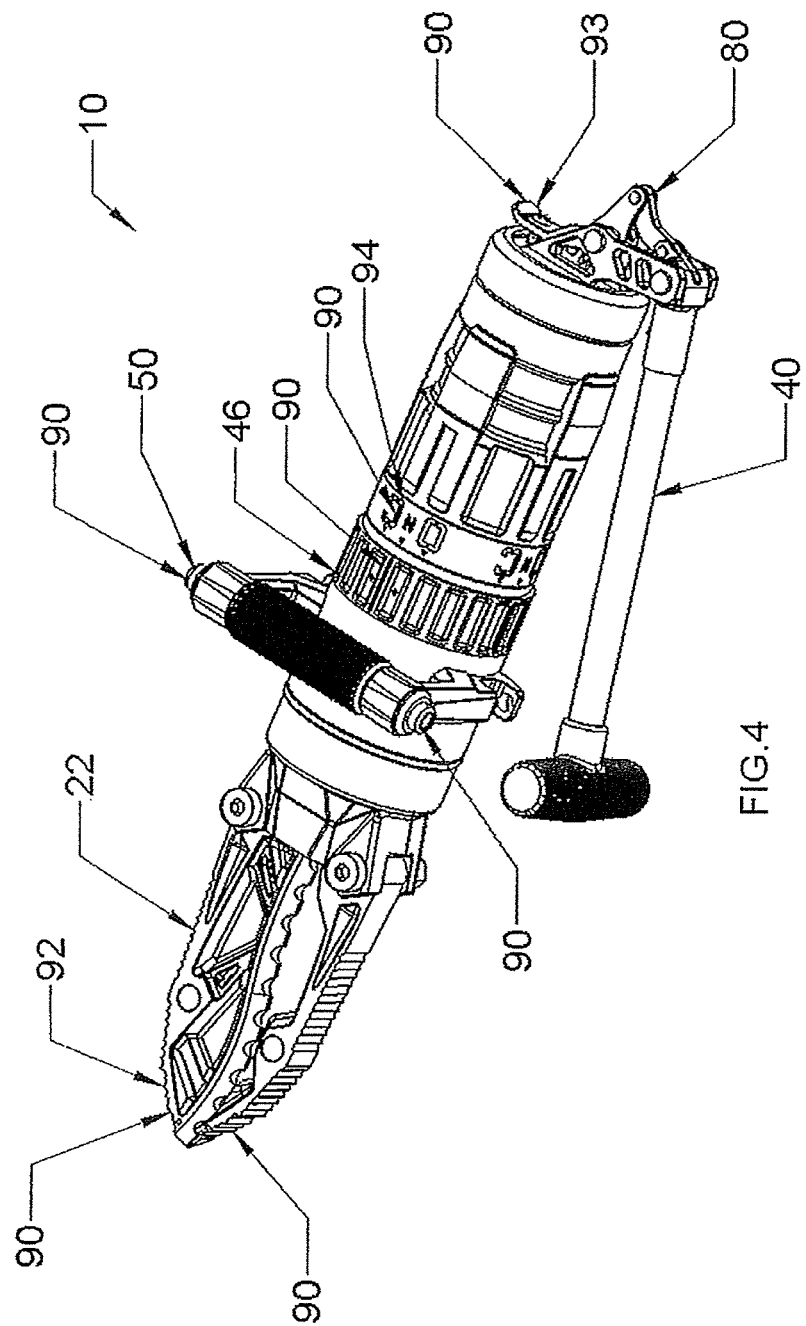
FIG. 4 is a perspective view of the rescue tool illustrated in FIG. 1 including an example of a plurality of IR (Infrared) indicator locations.

Turning now to FIG. 4, the rescue tool 10 may also include high visibility indication points or markings 90. These markings, preferably IR (Infrared) visibility markings can more readily be seen through night vision goggles. The IR indication points, strategically placed about tool 10, allow for a user to determine the position of the rescue tool 10 and critical components thereof, in environments where there is limited visible light such as, for example, a rescue situation that is conducted during night. In the embodiment illustrated in FIG. 4, the IR indication points 90 are located on the ends 32 of the arms 22, the button 50 ends 53, the mode markers 46, the lettering indicia 94 for the open position O, the neutral position N and the close position C markings, and fulcrum 93 for positioning the pressure pin 84.

Although FIG. 4 illustrates the IR indicators 90 located in the above-mentioned positions, it is understood that the IR indication points 90 may be placed along other parts of the rescue tool 10 as well. In one embodiment, the IR indicators 90 can be constructed by a phosphorescent coating or paint that includes phosphors such as, for example, silver-activated zinc sulfide or doped strontium aluminate, however it is understood that other types of paint, other coatings and tape that exhibit luminescence may be used as well. The IR indicators 90 typically glow a pale green to greenish blue color when illuminated. In other examples, indicators 90 may be reflective tape, paints or other coatings which are of higher visibility in normal working conditions, for example fluorescent green, yellow or orange. Other examples known by those skilled in the field may be used.

Referring now to FIGS. 5A-5B, an example of the two opposing force arms 22 is illustrated. Referring to FIG. 5A, both of the arms 22 include a compound curved blade 100 including a series of serrations 102 that are used to grip or cut though high strength materials such as, for example, sheet metal. Each of the blades 100 include a cutting edge or curved profile 104, where the compound curved profile 104 will aid a user in maintaining contact between the blades 100 and the engaging surface of the material that is to be cut or crushed (not shown). The curved profile 104 includes a first curved surface 106 having a radius 105 positioned toward end 32. Each blade 100 includes a second curved surface 108 having a radius 109. The cooperating and opposing concave surfaces 108 serve to grasp and hold a material to be cut (not shown) versus allowing it to slip or be forced toward ends 32 without shearing or deformation of the material unlike common straight or linear-shaped, scissor-like prior blades.

Figure 5C:
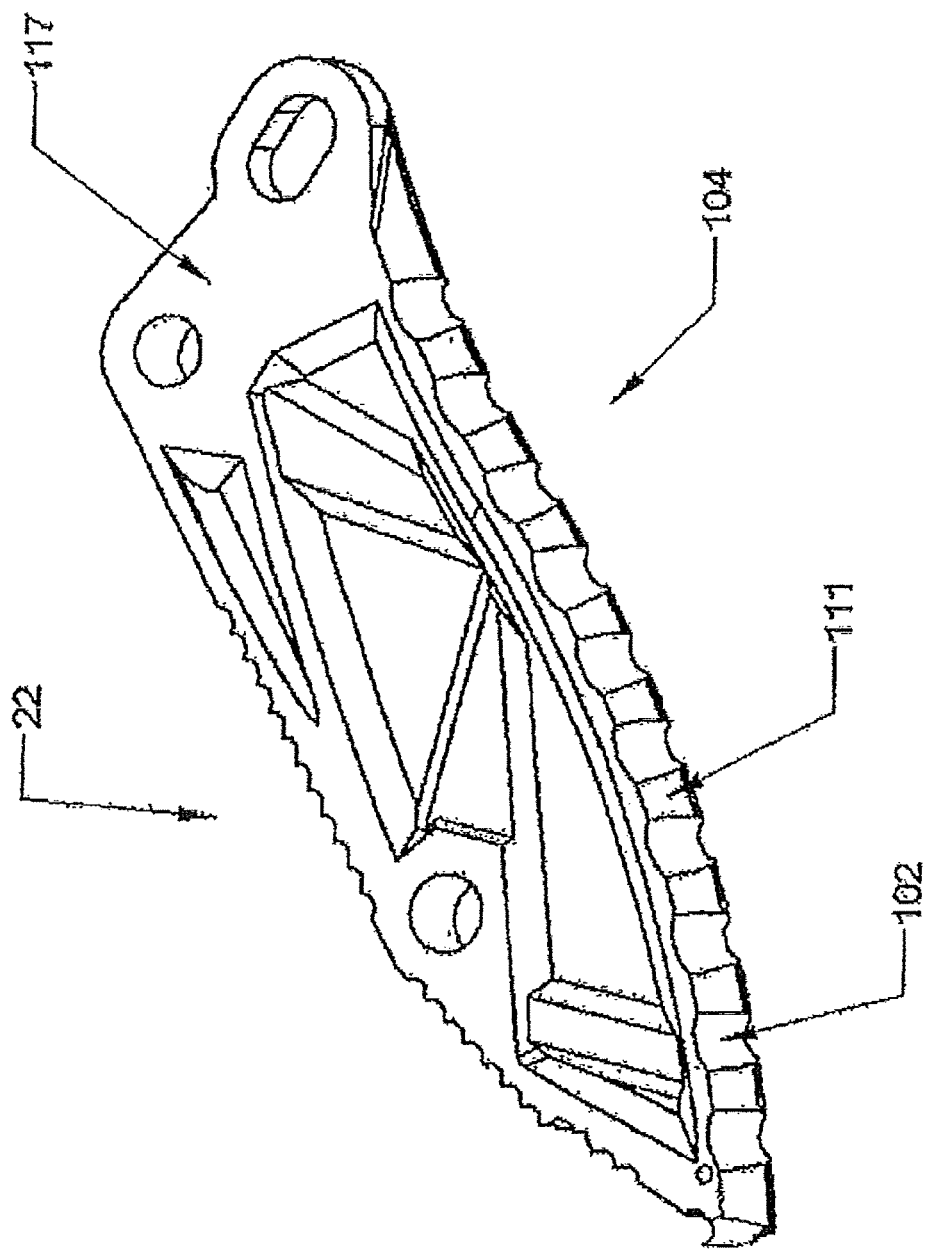
FIG. 5C is a perspective view of a single force arm with an alternate cutting edge or blade contour than that shown in FIGS. 5A and 5B.

Referring to FIG. 5C, in a preferred example of force arms 22, the cutting edge 104 includes a beveled portion 111 to provide a sharper, more focused cutting edge. In one preferred example, cutting edge serrations 102 are cut at an angle into the beveled portion 111 further away from the normal or perpendicular to the plane of the blade surface 117. This provides for further gripping and shearing action on a work piece. It is understood that different blade configurations and cutting surfaces may be used.

Continuing to refer to the example in FIG. 5A, the arms 22 also include a series of structural ribs 112 that are used to add strength and rigidity to the arms 22. In the embodiment as illustrated in FIG. 5A, the ribs 112 have a particular geometric pattern that provides improved strength to the arms 22 while reducing weight when compared to some other types of rib configurations. However, depending on the size, shape and the material that is used to construct the arms 22, the ribs 112 can be arranged in other configurations as well. In the example shown, the outer surface of each blade 100 is contoured and converges toward ends 32 as generally shown. Additional serrations or other functional features on the outer blade surface may be included as shown.

Turning now to FIG. 5B, the arms 22 of the jaw 24 are illustrated in the closed position. When in the closed position, the ends 32 of the arms 22 overlap one another across longitudinal axis A-A. A purchase point tip 120 is created by the overlap of the ends 32. The purchase point tip 120 provides a penetration point that can be used when the arms 22 or ends 32 are forcefully wedged into a small space or driven through a closed surface. Specifically, the overlapping ends 32 of the arms 22 are wedged into a space containing material that is to be spread apart by the jaw 24. As the jaw 24 opens, the material (not shown) located around the ends 32 of the arms 22 are engaged and forcibly separated under high force to create a larger opening. At least some types of jaws that are used for rescue tools tend to have ends where the arms do not overlap. This is a disadvantage as it may be difficult to wedge the tip of the jaw into a narrow space and then spread the jaw into the opened position.

As explained above, each force arm 22 can be made from high strength materials. In an example, not shown, softer lighter weight materials, for example high strength aluminum with carbide inserts for a hardened cutting edge.

Referring to FIG. 5A, the jaw 24 includes a maximum spread A between the arms 22. In a preferred example of rescue tool 10, the maximum spread A can be about sixteen inches. In an effort to increase the maximum spread A of the jaw 24, a pair of jaw extenders 122 illustrated in FIGS. 6A-6B may be used. In one example, the jaw extenders 122 slip over an exterior surface 124 and the ends 32 of the arms 22 and include a maximum spread A' when in the open position. In one preferred embodiment, the maximum spread A of the jaws (FIG. 5A) is increased from sixteen inches to eighteen inches when the jaw extenders 122 are included, however, it is understood that different dimensions may be used or achieved as well.

Jaw extenders may be attached to arms 22 through an aperture 126 aligned with aperture 114 in arms 22 through common fasteners (not shown). In a preferred example, the jaw extenders 122 are constructed of a relatively lightweight and high strength material such as, for example, aluminum and are readily replaced independently, or along with arms 22, in the event of damage, fatigue or wear. Different configurations of jaw extenders 122 and relative placement and attachment to arms 22 known by those skilled in the field may be used.

Figure 7:
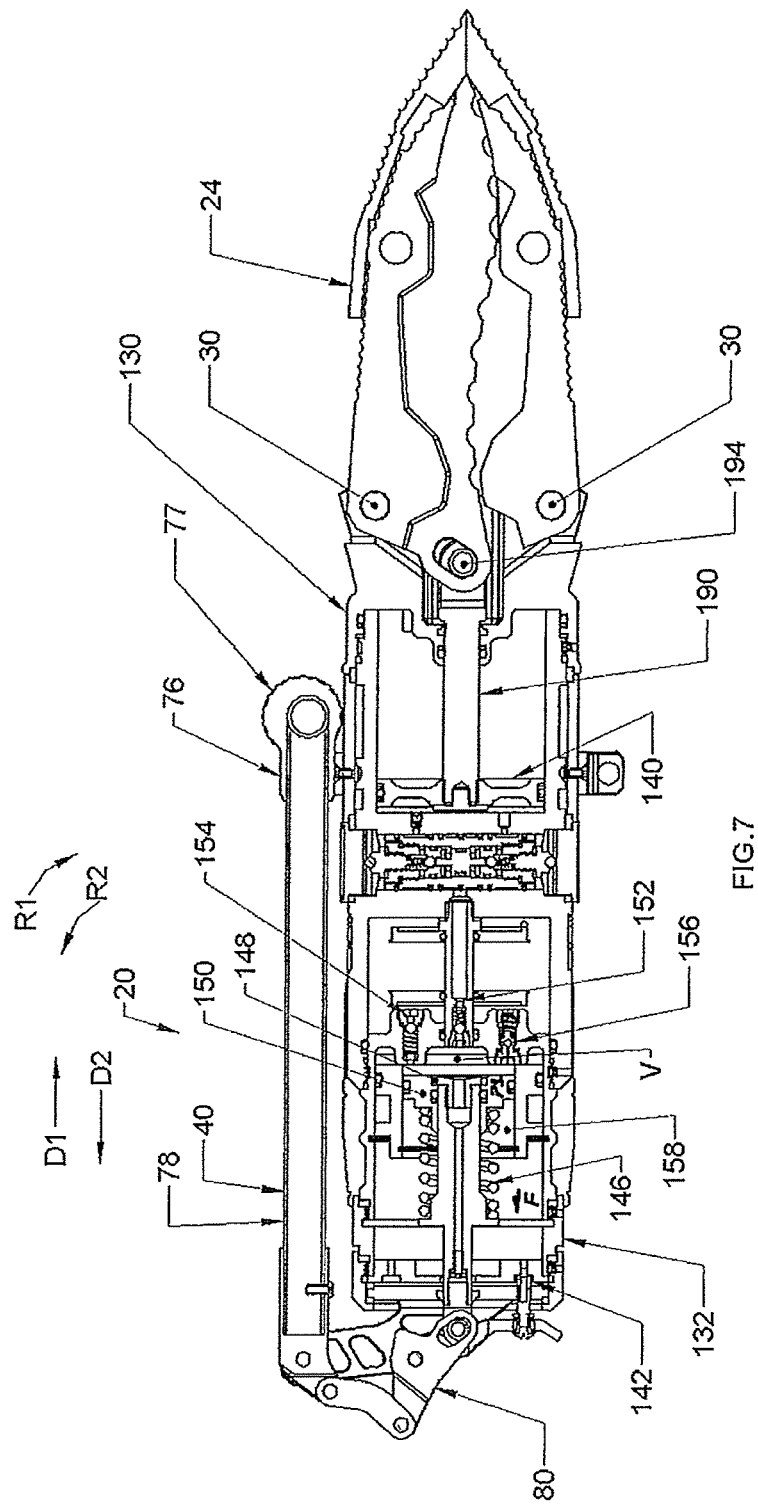
FIG. 7 is a cross sectional view of the rescue tool taken along line 7-7 illustrated in FIG. 10 showing the rear handle in a stowed position and the variable hydraulic piston system fully extended and exemplary position of rear handle stowed.
Figure 8:
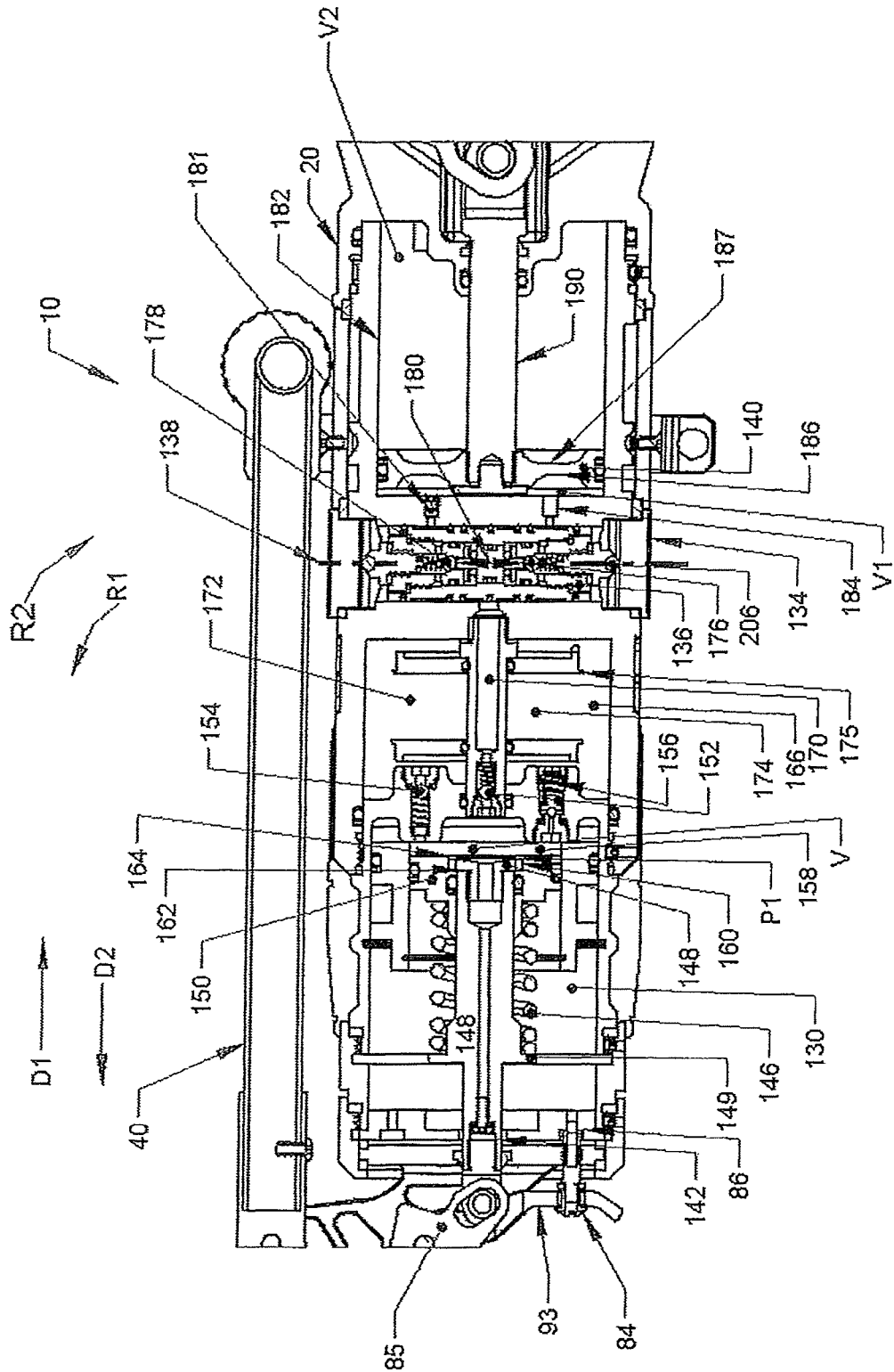
FIG. 8 is an enlarged view of a portion of the cross sectional view illustrated in FIG. 7.

FIGS. 7 and 8 are a cross sectional views of an example of the fluid displacement system 130 that is located within the interior of the main body 20. In one example shown, the fluid displacement system 130 is in the form of a hydraulic pump device 130 used to provide the force needed to selectively actuate the jaw 24 between the open and closed position and provide significant force to the arms 22 to separate, lift, crush or cut materials (not shown) in an emergency or rescue operation. The exemplary fluid displacement system 130 includes a hydraulic fluid as such, for example, oil (not shown). In one embodiment, the hydraulic fluid can be a phosphate-ester fluid that is fire resistant and electrically non-conductive, which is especially advantageous in a rescue situation where there may be fire or another type of hazard. The hydraulic system 130 may include a switch valve system 134 described below. The variable hydraulic system 130 is actuated by movement of the actuating handle 40 in the directions R1 and R2 through the first 87 and second positions 89 about the linkage system 80. The switch valve system 134 selectively allows for a ram 140 to actuate the jaw 24 depending on the position of the toggle switch or dial 36 (FIG. 1).

In the example illustrated, the fluid displacement system 130 includes a connecting member 142 that is connected to the rocker link 85 of linkage system 80. System 130 further includes a biasing member 146, a low volume piston 148, a high volume piston 150, a supply valve 152, a feed valve 154, a safety valve 156, a fluid reservoir 172 and a fluid cylinder 158.

In one example, the biasing member 146 is initially positioned and compressed between an integral flange 149 on the low volume piston 148 and the high volume piston 150 to normally bias the high volume piston 150 in direction D1 against the head of low volume piston 148. The connecting member 142 is attached to the low volume piston 148. The connecting member 142 can be selectively actuated axially back and forth by movement of the rear handle 40 in the directions R1 and R2 to move both of the low volume piston 148 and the high volume piston 150 along axis A-A. Specifically, when the extending arm 78 of the actuating handle 40 is positioned at first position 87, near one of the slots 76 of the front handle 38, both of the low volume piston 148 and the high volume piston 150 are each positioned in a first position P1 of the fluid cylinder 158 as best seen in FIG. 8. In this position, a volume V of the sealed fluid cylinder 158 is at a minimum. As the rear handle 40 is actuated in the direction R1, the connecting member 142 is axially displaced rearwardly in a direction D2. As the connecting member 142 is moved in the direction D2, the low volume piston 148 and high volume piston 150 are also displaced in the direction D2. An outer surface 160 of the low volume piston 148 engages with a seat 162 located along an outer surface 164 of the high volume piston 150. When the low volume piston 148 is actuated in the direction D2, the high volume piston 150 is also moved in the direction D2 due to the engagement between the low volume piston 148 and the high volume piston 150.

As the actuating handle 40 is actuated in the direction R1, a pressure differential forms between the sealed cylinder 158 and the reservoir 172 which forces open the feed valve 154. The feed valve 154 is fluidly connected to the fluid reservoir 172 containing an abundance of hydraulic fluid. When the feed valve 154 is opened, hydraulic fluid is forcibly drawn from the reservoir 172 and into the fluid cylinder 158. In the embodiment as illustrated, each of the feed valve 154, the supply valve 152, and the safety valve 156 are all ball check valves that include a spring-loaded spherical ball for closing each of the valves. Such check valves have a predetermined crack pressure or opening pressure whereby the ball or other stop is forcibly opened against a biasing force to allow passage of fluid. However, it is understood that other types of check valves that allow for one directional fluid flow may be used as well. Reservoir 172 may further include a sealed bladder system 174 positioned within reservoir 172 having end plates 175 and a membrane or cylindrical wall (not shown). For one example of a fluid bladder, see FIGS. 14 and 17 explained further below. Other fluid reservoir designs known by those skilled in the field may be used.

In an example of operation of variable hydraulic system is shown in FIGS. 7 and 8. In a typical use, for example an emergency when an opening needs to be made to extract a person from a crushed vehicle compartment, the jaw 24 would be closed or partially closed. Once arm 22 ends 32 were positioned, and support 38/338 and actuating 40/340 handles circumferentially positioned for maximum range of movement of actuating handle 40 between the first and second positions, toggle dial 36 would be positioned to the "O" open position or mode to initiate opening the jaw 24. Actuating handle 38 hand grip would be grasped and rotated from a first position 87 toward second position 89. Link system 80 (or cam member shown in FIGS. 14-16) and connecting member 142 would axially displace low volume piston 148 and high volume piston 150 rearward. The pressure differential between the cylinder 158 and reservoir 172 would force open feed valve 154 and allow fluid to flow from reservoir 172 into cylinder 158 until actuation of actuating handle 38 stops or reaches its maximum displacement at second position 89. At second position 89, both the low volume piston 148 and high volume piston 150 are drawn to the rear extent of cylinder 158 (not shown) and cylinder 158 would be at a maximum fluid capacity. The pressure differential having been equalized or reduced beyond a predetermined level, feed valve 154 would close preventing fluid flow in either direction.

On articulation of actuating handle 40 in a direction R2 toward first position 87, link system 80 (or cam member shown in FIGS. 14-16) would displace connecting member and low volume piston 148 axially forward in direction D1 toward jaw 24. At a low resistance force by the material to be spread, the biasing member 146 will keep high volume piston 150 in contact with low volume piston 148 and both pistons will move axially forward together thereby displacing a maximum amount of fluid to actuate the arms 22 as further described below. Lockstep movement of both pistons will continue in this manner through cyclical articulation of rear or actuating handle 38 between first and second positions until a predetermined resistance to further movement of jaw 24, or internal fluid pressure in body 20, is experienced.

As best seen in FIG. 9, when a predetermined resistance to further movement of jaw 24, or internal fluid pressure is experienced in body 20, the fluid pressure in cylinder 158 necessary to force additional fluid to the jaw 22, discussed further below, will eventually increase beyond the biasing force of biasing member 146 against high volume piston 150 preventing high volume piston 150 from further axial movement in direction D1 to assist in forcing more fluid to move jaw 24. In this condition, the low volume piston 148 remains movable relative to stationary high volume piston so an operator can continue to force fluid, although at a smaller fluid displacement, but at a higher pressure to forcibly move the jaws further, for example to overcome a significant resistance force against the jaw. This continued low displacement, high pressure and force ability or condition of the tool 10 due to the variable hydraulic or fluid displacement system 130, has the added advantage of reducing the effort the operator must exert on the rear handle 40 to keep the jaw 24 moving in the selected mode or direction. If the pressure in cylinder 158 increases beyond a predetermined maximum, further movement by the pistons opens safety valve 156 allowing passage of fluid from the cylinder 158 back to reservoir 172 to prevent damage to tool 10.

In an alternate example, for example cutting a relatively soft material, the tool 10 and variable fluid displacement system 130 is very advantageous by allowing a maximum amount of fluid to be forced, and thereby maximum movement or displacement of jaw 24, while ensuring the effort required by an operator in articulating rear handle 40 does not become excessive. As explained, if the resistance force on jaw 24, or internal fluid pressure in system 130 reaches a predetermined level, high volume piston 150 will become stationary, and the operator will only need to exert the lesser force necessary to move low volume piston 148 to keep the jaw 24 moving. Should the resistance force against the jaw to begin low, remain low, or temporarily decrease or suddenly drop during jaw movement, the internal pressure in system 130 would also drop, the biasing member 146 would again force high volume piston 150 against low volume piston 148, thereby automatically changing hydraulic operation back to a maximum fluid moving condition to maximize the speed and effectiveness of tool 10 critically necessary in emergency situations. The same variability is achieved is a significant or temporary resistance against jaw movement occurs. As discussed further below, in a jaw closing example, the system 130 would operate substantially the same way with variable movement of the pistons. Other configurations of system 130 and variations in the methods of operation known by those skilled in the field may be used.

As best seen in FIG. 8, when the actuating handle 40 moves in a direction R2 and the pistons axially move to force fluid from cylinder 158, the pressure differential between cylinder 158 and fluid passageway 170 would force or crack supply valve 152 open allowing the passage of pressurized fluid to move forward to valve assembly 134 and jaw 24 as described below. Supply check valve 152 prevents passage of fluid moving from passageway 170 back to cylinder 158.

Figure 18:
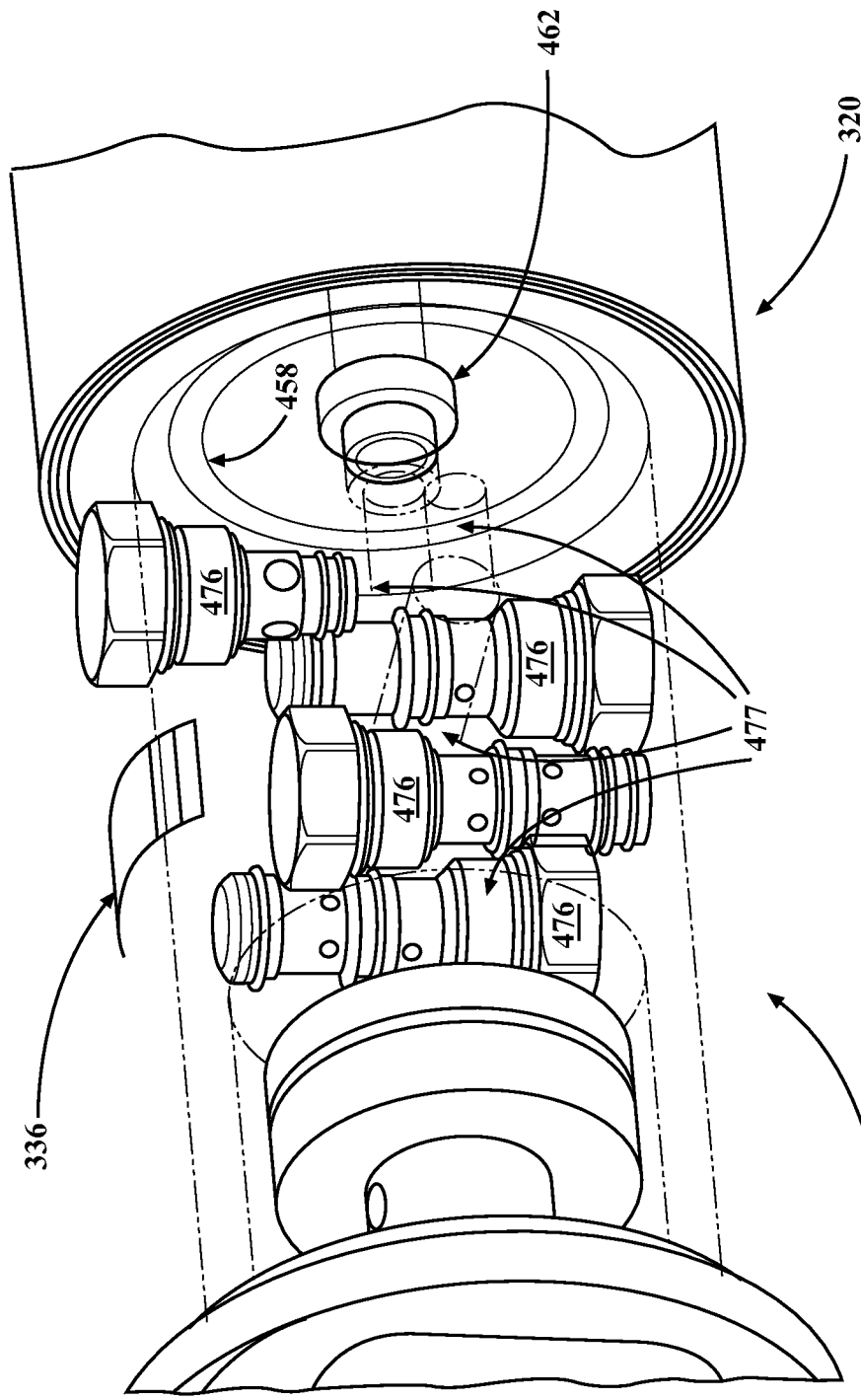
FIG. 18 is a partial enlarged perspective view of an example of fluid valves and passageways for use in the example shown in FIG. 14.

As best seen in FIG. 8, the valve assembly 134 selectively allows pressurized fluid to pass from cylinder 158 to the ram 140 to actuate the jaw 24 depending on the position of the toggle switch or dial 36 (FIG. 1). The valve assembly 134 includes valve body 136 that may move axially along axis 138 transverse to longitudinal axis A-A depending on whether the toggle dial 136 is in an opening O, closing C or neutral mode N. Valve body 136 includes a plurality of fluid passage channels (not shown) and houses a first valve 176, a second valve 178, and an axially movable piston 180 that is in fluid communication with the fluid passageway 170. Similar to the variable fluid displacement system 130, the first valve 176 and the second valve 178 are each illustrated as ball check valves, however, it is understood that other types of check valves that allow for one directional fluid flow may be used as well. An alternate valve system is illustrated in FIG. 18 and described below.

The first valve 176 is fluidly connected to a fluid port 184, where hydraulic or other fluid can flow through the first valve 176, through a fluid passageway or galley (not shown), the opening port 184, and into a first volume V1 of an actuation cylinder 182 that is located on a first side 186 of the ram 140. In a jaw 24 first or opening O mode, valve body 136 is axially moved, upward in FIG. 8, along axis 138 (to the left in FIG. 12 discussed below). In this position, valve body 136 allows pressurized fluid to axially move and pass piston 180 toward first valve 176. Assuming there is a resistance force or load on jaws 24 and an initial pressure or force rearward in a direction D2 on ram 24 thereby resisting forward movement of the ram in a direction D1, both first 176 and second 178 valves will be forced in the closed position preventing fluid from passing back to reservoir 172. If pressurized fluid from the pistons and cylinder 158 overcomes the closing pressure exerted on first valve 176, valve 176 will open allowing pressurized fluid to pass through port 184 into actuating cylinder 182 to move ram 140 forward in direction D1 to incrementally and progressively open jaw 24. In this jaw opening mode, second valve 178 allows fluid to flow from the opposing side 187 of the ram forced out of volume V2 by the ram through fluid passageways or galley (not shown) from V2, through second valve 178, and back to reservoir 172.

When toggle switch or dial 36 is moved to the "C" or jaw 24 closing mode, valve body 136 is axially moved, downward in FIG. 8, along axis 138 (to the right in FIG. 12 as further discussed below). In this position, valve body 136 allows pressurized fluid to axially move and pass piston 180 to second valve 177. Assuming jaw 24 is under a load, and both first 176 and second valve 178 are forced into a closed position, if the pressure of fluid from cylinder 158 exceeds the pressure from actuating cylinder 182 from the V2 side 187 of the ram, second valve 178 will open allowing fluid to pass through a passage or galley (not shown) to enter V2 and forcing ram 140 rearward in a direction D2 thereby incrementally and progressively closing jaw 24. Similarly, fluid from V1 is allowed to pass through first valve 176 back to reservoir 172 through passageways (not shown). In either an opening or closing mode, if the pressure in the actuating cylinder 182 is higher than the fluid pressuring coming from pistons and cylinder 158, the respective first 176 and second 178 valves will remain closed until such pressure in the actuating cylinder 182 is overcome. If the pressure is not overcome, and the pressure in cylinder 158 exceeds a predetermined limit, for example with the resistance on the jaw 24 exceeds the operating limit of tool 10, the safety valve 156 will open and fluid will pass to the reservoir until the force resistance condition is removed.

Figure 13:
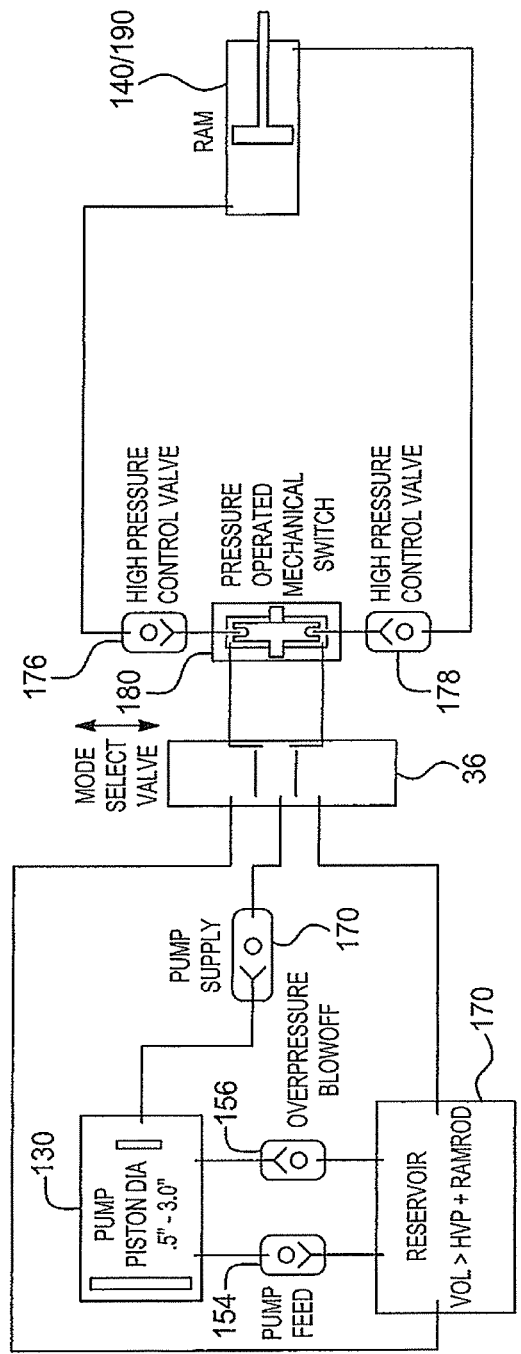
FIG. 13 is a schematic example of a variable hydraulic fluid displacement system.

In a condition when tool 10 and toggle dial 36 is in a neutral N mode, both opening 176 and closing 178 valves remain locked closed and any pressurized fluid moved from pistons and cylinder 158 passing to valve assembly 134 is routed by valve body 136 through passageways or galleys (not shown) back to reservoir 172 regardless of any resistance force on jaw 24 or pressure in actuating cylinder 182. An exemplary variable fluid displacement system 130 schematic is shown in FIG. 13. Other hydraulic fluid systems including a reservoir, pump, fluid passageways, valves and a ram connected to a jaw may be used as known by those skilled in the art. An alternate example is shown in FIGS. 14-18.

Figure 10:
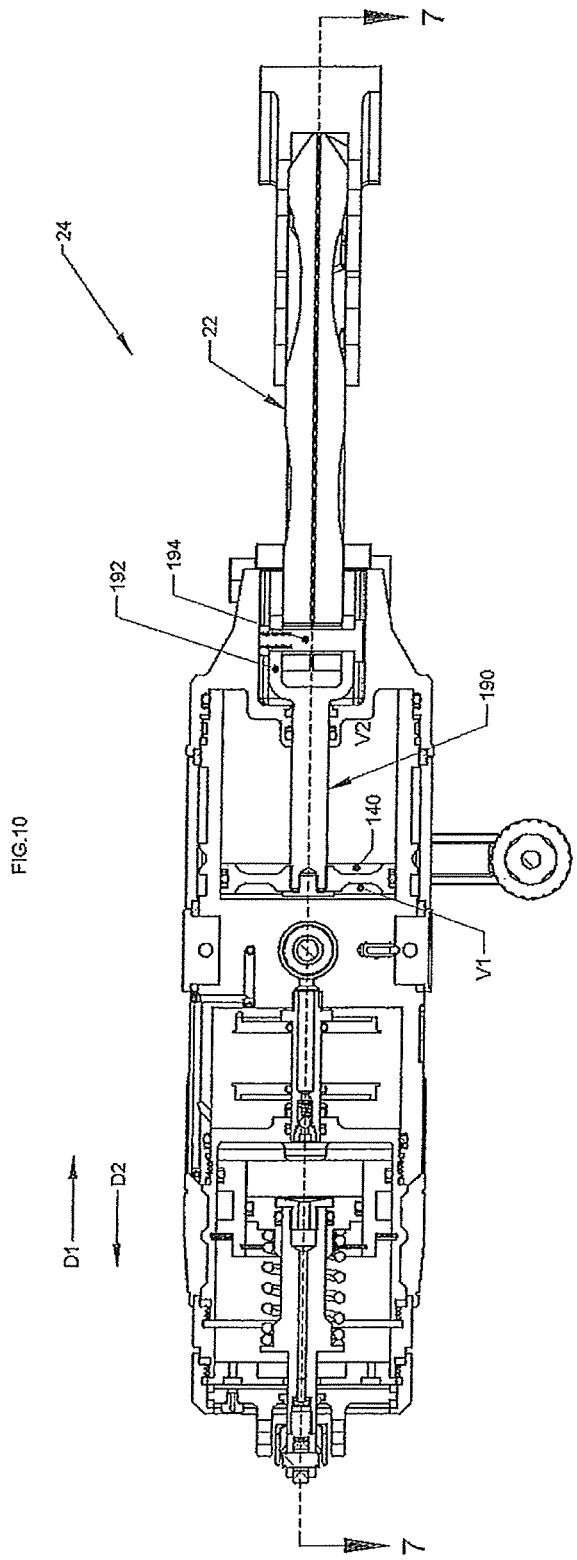
FIG. 10 is a cross sectional view of the rescue tool taken along line 10-10 in FIG. 1 with the front handle rotated 90 degrees.
Figure 11:
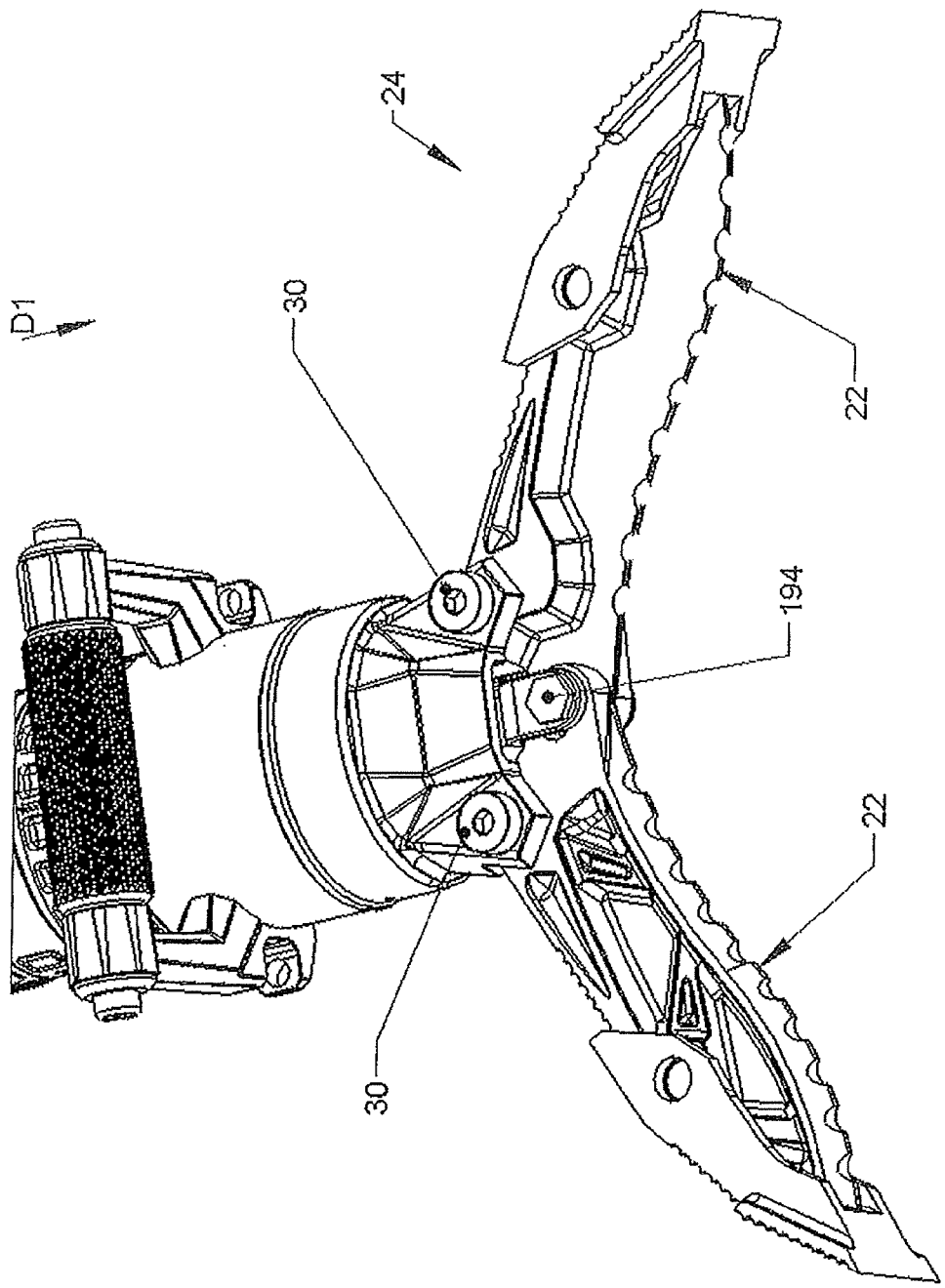
FIG. 11 is a rotated perspective view of the jaw of the rescue tool taken in the Z direction in FIG. 3.

In the example shown in FIGS. 7, 8 and 10, the ram 140 is connected to and actuates a connecting arm 190. The connecting arm 190 includes a generally U-shaped member 192 that is connected to a main pivot pin 194. When the ram 140 is in the first position as shown in FIG. 10, the arms 22 are in the closed position. The main pivot pin 194 connects both the arms 22 to the U-shaped member 192. As the first volume V1 progressively fills with fluid, for example in a jaw opening mode of operation, the ram 140 is forced forward in the direction D1 from the first position progressively toward a second position and the connecting arm 190 is also actuated in the direction D1, along with the U-shaped member 192. When the U-shaped member 192 is actuated in the direction D1, the main pivot pin 194 is urged in the direction D1 as well. Movement of the main pivot point 194 in the direction D1 causes the arms 22 to pivot about their respective pivot points 30 (FIG. 1) through blade apertures 31, which progressively and incrementally forces the jaw 24 to open. FIG. 11 is an illustration of the main pivot point 194 and the arms 22 actuated in the direction D1 where the jaw 24 is fully actuated in the open position. The reverse occurs when the jaw 24 is in a closing mode.

Figure 12:
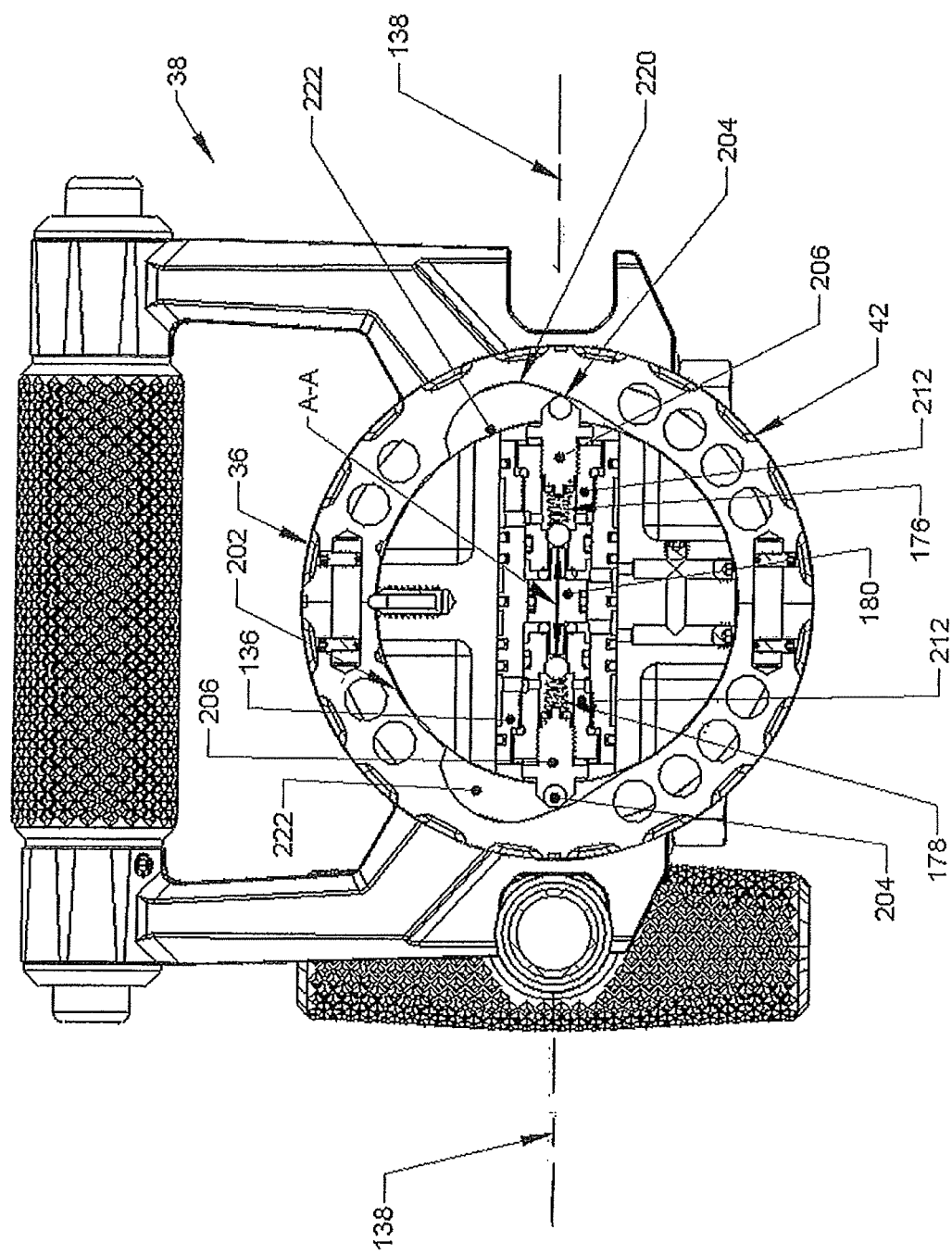
FIG. 12 is a cross sectional view taken along section line 12-12 in FIG. 1.

FIG. 12 is a cross sectional view of the toggle dial or switch 36 and valve assembly 134 taken along section lines 12-12 in FIG. 1. The valve assembly 134 further includes ring 42 of the toggle dial 36 (FIG. 1). In the example illustrated, as the one of the actuation positions is selected, the ring 42 is rotated about the longitudinal axis A-A. The ring 42 includes an inner contacting surface 202 that maintains continuous engagement with valve body 136 through a bearing member 204, shown in the example as part of each of the first valve 176 and the second valve 178 (FIG. 8). In the example shown, bearing members 204 each include a housing 206 threadibly engaged into the respective 176 and 178 valve assemblies. Ring 42 and contacting surface 202 may be made from the same materials as body 20. The inner portion of ring 42 defining contact surface 202 may be made from a different material as the outer ring 42 such as stainless steel or other materials known by those skilled in the field.

The inner contacting surface 202 includes a variable profile 220 including two generally symmetrical actuation pockets 222. The pockets 222 force one of the bearing members 204, and the valve housing 136, along axis 138 to position valve housing 136 to properly allow pressurized fluid to pass piston 180 toward either of first 176 or second 178 valves that are appropriate depending on the selected toggle switch 36 jaw mode. In one example, if the toggle dial 36 is set to the opened position O (rotated counter-clockwise in FIG. 12), the ring 42 is rotated accordingly about the axis A-A, causing the bearing 204 associated with the second valve 178 to move radially outwardly away from the axis A-A along axis 138 which axially moves and positions valve body 136 to allow passage of pressurized fluid to first valve 176 to incrementally open the jaw 24 as described above In a jaw closing mode C, ring 42 is rotated clockwise, the valve body 136 is axially moved in the opposite direction, and pressurized fluid is allowed to pass to the second valve 178 to incrementally close jaw 24 as described above.

In the examples shown, if ring 42 of toggle dial 36 is positioned at the "N" or neutral position, as shown in FIG. 12, both valves 176 and 178 remain closed preventing fluid from passing or exiting to or from V1 and V2 which effectively locks arms 22 and jaw 24 in position. Any further activation of actuating handle 40 simply is forced back to reservoir 172 as previously described. Other valve components, configurations and methods of operation known by those skilled in the field may be used.

Figure 15:
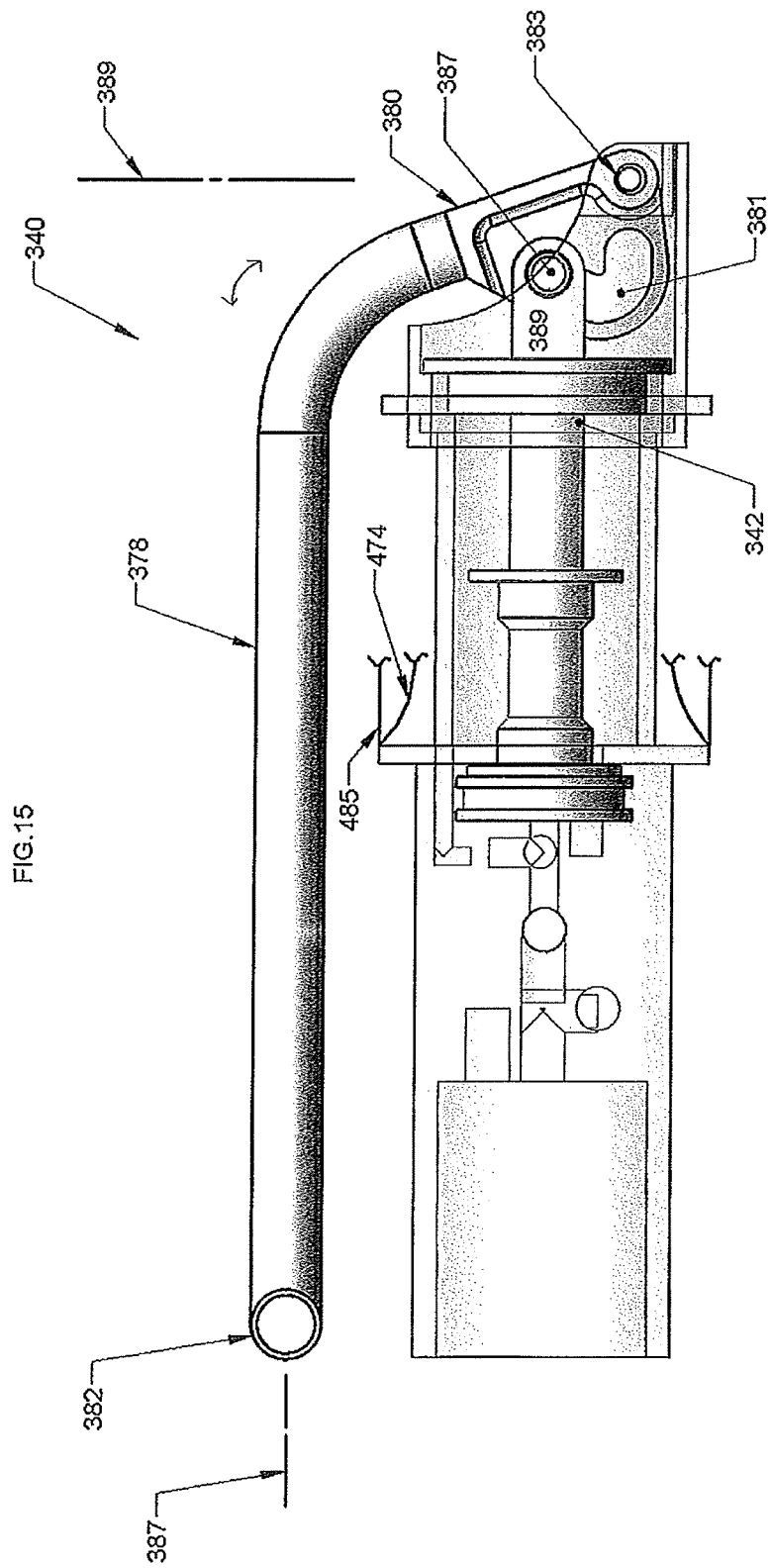
FIG. 15 is a side view of the alternate rescue tool shown in FIG. 14.
Figure 16:
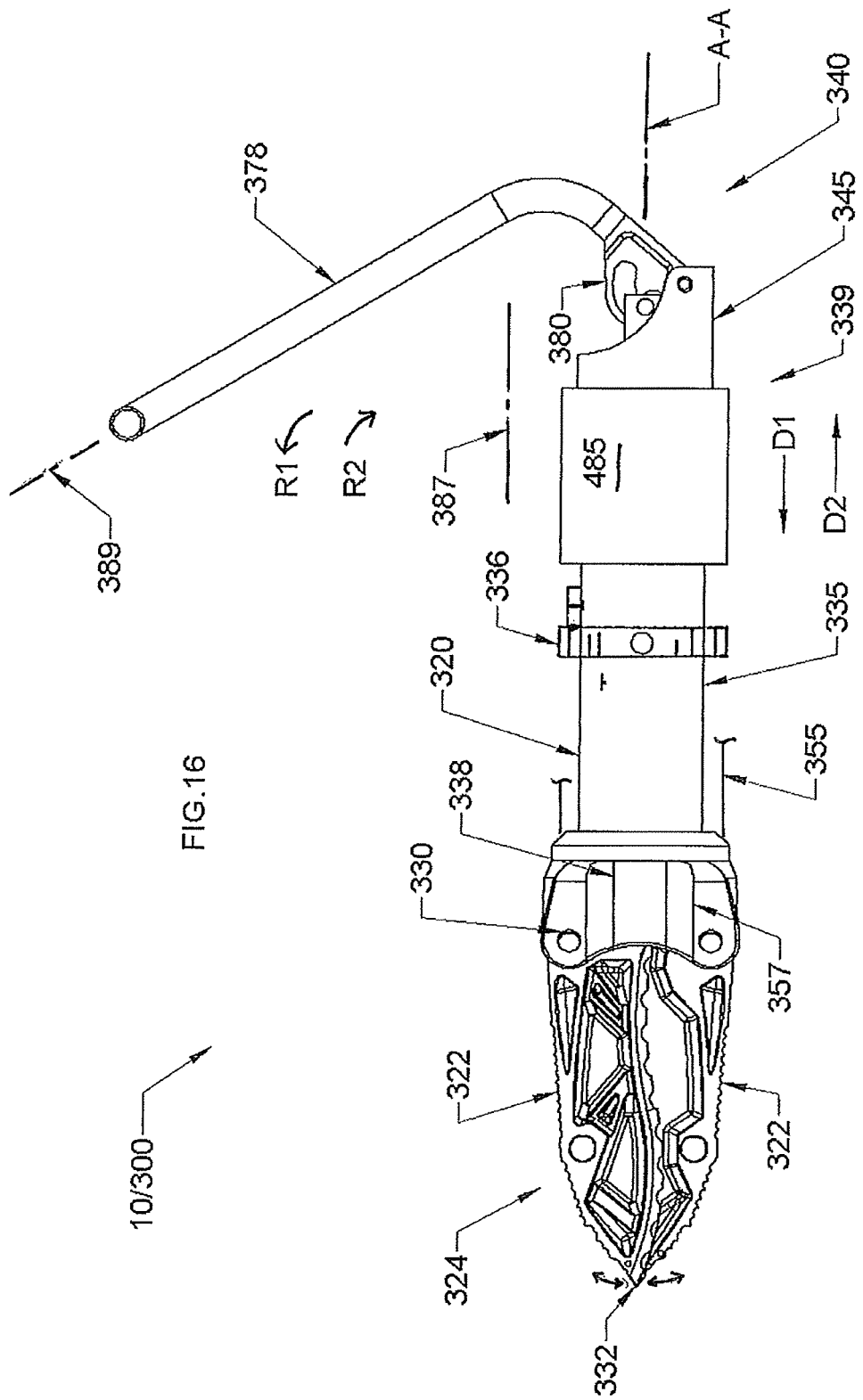
FIG. 16 is an alternate side view of FIG. 14 showing the fluid reservoir components positioned on the tool body.

Referring to FIGS. 14-18, an alternate example of rescue tool 10/300 is illustrated. Referring to FIG. 16, tool 300 includes a cylindrical shaped body 320, first and second force arms 322 having tips or ends 322, a toggle or switch dial 336, an integrated support handle portion 338, and a pivoting actuation handle 340 having first 387 and second positions 389 defining a range of movement or motion. Although differences in design, features and functions are noted below, it is understood that many of the components, features and functions from the first example of tool 10 described above may be used or modified for use in exemplary tool 300 as known by those skilled in the art.

Referring to FIG. 16, exemplary tool 300 generally includes a smaller diameter body 320 including a reduced diameter mid-section 335 and a larger diameter rear section 339 which houses the actuating piston, piston cylinder and reservoir as described and illustrated below. Body 320 further includes an extension portion 345 suitable to protect the actuating handle pivot mechanism as further described below. In the example shown, body 320 further includes an molded-over cover 355 extending over at least a portion of the body 20 to protect the tool from impacts and other abrasions that may be experienced in harsh working environments and heavy-duty use in the field. Cover 355 can be made from urethane, elastomers, polymers and other materials known by those skilled in the field.

As shown in FIG. 16, in place of rotatable support handle 38 in the prior example, tool 300 includes an integrated handle 338 which serves a fixed or stationary part of the body exterior surface. The exemplary integrated support handle includes forms 357 which provide for a positive grip on the body 320 by a user. Integrated handle 338 may be a structural part of the body, or may be in the form of a separate piece that is secured to the housing by fasteners (for example pivot pins 30), adhesives or other attachment methods known by those skilled in the field. Integrated handle 338 may further be part of the molded-over body cover 355.

Referring to FIGS. 14-16 an alternate actuating or rear handle and linkage design 340 is illustrated. In the example, actuating handle 340 includes an elongate member or extending arm 378 ending with a hand grip portion 382. Handle 340 further includes a cam member 380 pivotally connected to body extension 345 with a pivot pin 383. Cam member 380 includes an angled or contoured slot 381 for sliding and guiding receipt of a clevis pin 387 engagable with a clevis 389 attached to a connecting member 342 engaged to the piston 148. Actuating handle is operable to pivot between a first position generally indicated at 387 to a second position 389. First and second positions may vary in position and degree of motion or freedom from those illustrated positions as known by those skilled in the art. Handle elongate member 378 and cam member 380 may be made from high strength aluminum, steel or other high strength, light weight materials.

Figure 17:
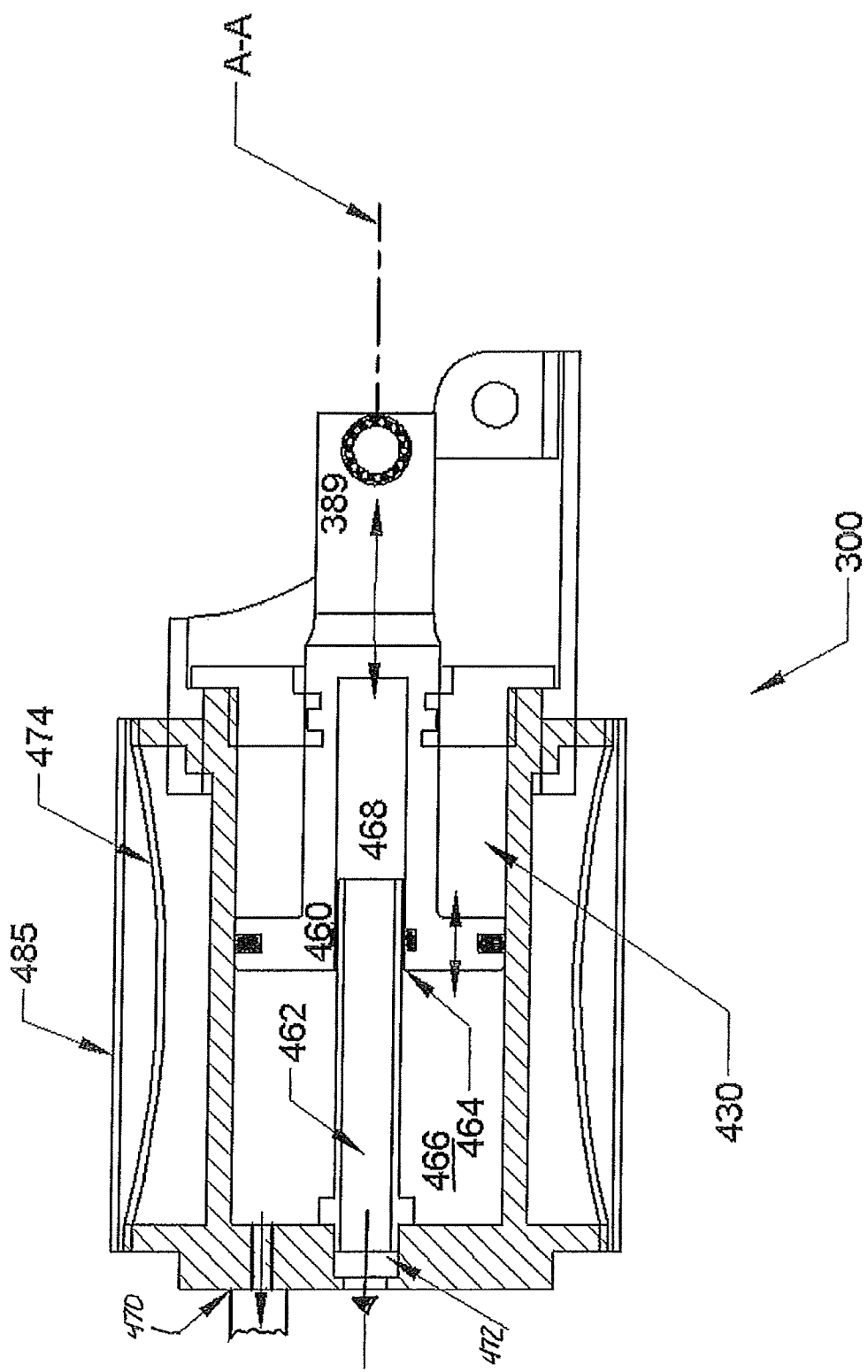
FIG. 17 is a partial sectional view taken along lines 17-17 shown in FIG. 14.

Referring to FIGS. 14, 15 and 17, an alternate fluid displacement system 430 is illustrated. As best seen in FIG. 17, a dual chamber design is illustrated. In the example, a piston or fluid cylinder 458 sealingly engages a high fluid volume first piston or pump 460 which is displaceable along longitudinal axis A-A through connection to the actuating handle (not shown). A low fluid volume second piston or pump 462 is preferably axially fixed in position and is sealed inside an elongate opening 464 in the face of piston 460 allowing relative axial movement of the first piston to the second piston. The high volume first piston 460 and cylinder 458 define a first high volume chamber 466 and the low volume or second piston 462 and the elongate opening 464 in first piston 460 define a lower volume second chamber 448 inside the first piston 460 as generally shown.

In one example of operation of fluid displacement system 430, when the actuating handle (not shown) is moved from a first position to a second position, clevis 389 and first piston 460 are axially displaced rearward (to the right in FIG. 17) increasing the available volume in first chamber 466. Simultaneously, second chamber 468 also increases in available volume as the first piston axially moves relative to the second piston. As first piston 460 moves rearward, the fluid pressure differential between the chambers and bladder reservoir 474 changes drawing fluid through passageways and check valves (both not shown) to charge or fill both the first 466 and second 468 chambers with fluid.

In a low force mode, for example when there is relatively little force resistance against movement of the force arms, on cycling the actuating handle back toward the first position, cam member 380 axially displaces first piston 460 forward (to the left in FIG. 17). This axial movement forces fluid from both of the high volume chamber 466 and low volume chamber 468 through respective first 470 and second 472 ports through fluid passages and valves (generally shown in FIG. 18 or the first example described above). In a low force resistance situation, both pistons force a high volume of fluid through the downstream valves (FIG. 18) to act on the ram and the connected force arms where, due to the large volume of fluid acting on the ram, incrementally rotates the force arm (or arms) at a higher rate of angular displacement.

Where a high resistance force is acting on the force arms, and thus requiring more fluid pressure in tool 300 to incrementally move the force arms, a high resistance fluid pressure will build up in first chamber 466. To enable continued movement of the force arms while keeping the required physical effort on actuating handle manageable for a user, on further cycling of the actuating handle, the valve (not shown) in fluid communication with first chamber 466 and first port 470 will redirect or dump fluid from the first chamber 466 back to the low pressure reservoir 474. On further cycling of the actuating handle, the fluid from the lower volume second chamber 468 will continue to be routed through valves (FIG. 18) to the actuating cylinder and ram to move the force arms against a high resistance force, at a lower angular displacement rate due to the lower volume acting on the ram. This allows a user to keep the force arms moving, while maintaining manageable level of effort required on the actuating handle. When the tool reaches a maximum working load capacity, fluid from the second chamber 468 will open a safety valve routing any additional fluid from the chamber 468 back to the reservoir to avoid damage to the tool. Other components and systems for routing known by those skilled in the art may be used.

As best seen in FIG. 17, a fluid reservoir in the form of a bladder 474 is used. In the example, instead of reservoir and bladder 174 shown forward of the fluid cylinder 158 in FIG. 8, the example in FIG. 17 positioned the bladder 474 circumferentially around the fluid or piston cylinder 458 as generally shown. Fluid valves and passages generally described for the first example may be used to permit fluid to flow (or be drawn from) reservoir bladder 474 and prevent the flow of fluid to and from the cylinder 458 under low and high fluid pressures as well as a safety condition where the resistance forces or fluid pressure exceed the working capacity of the tool. A hard, robust outer covering, for example a portion of the body.

Figure 19:
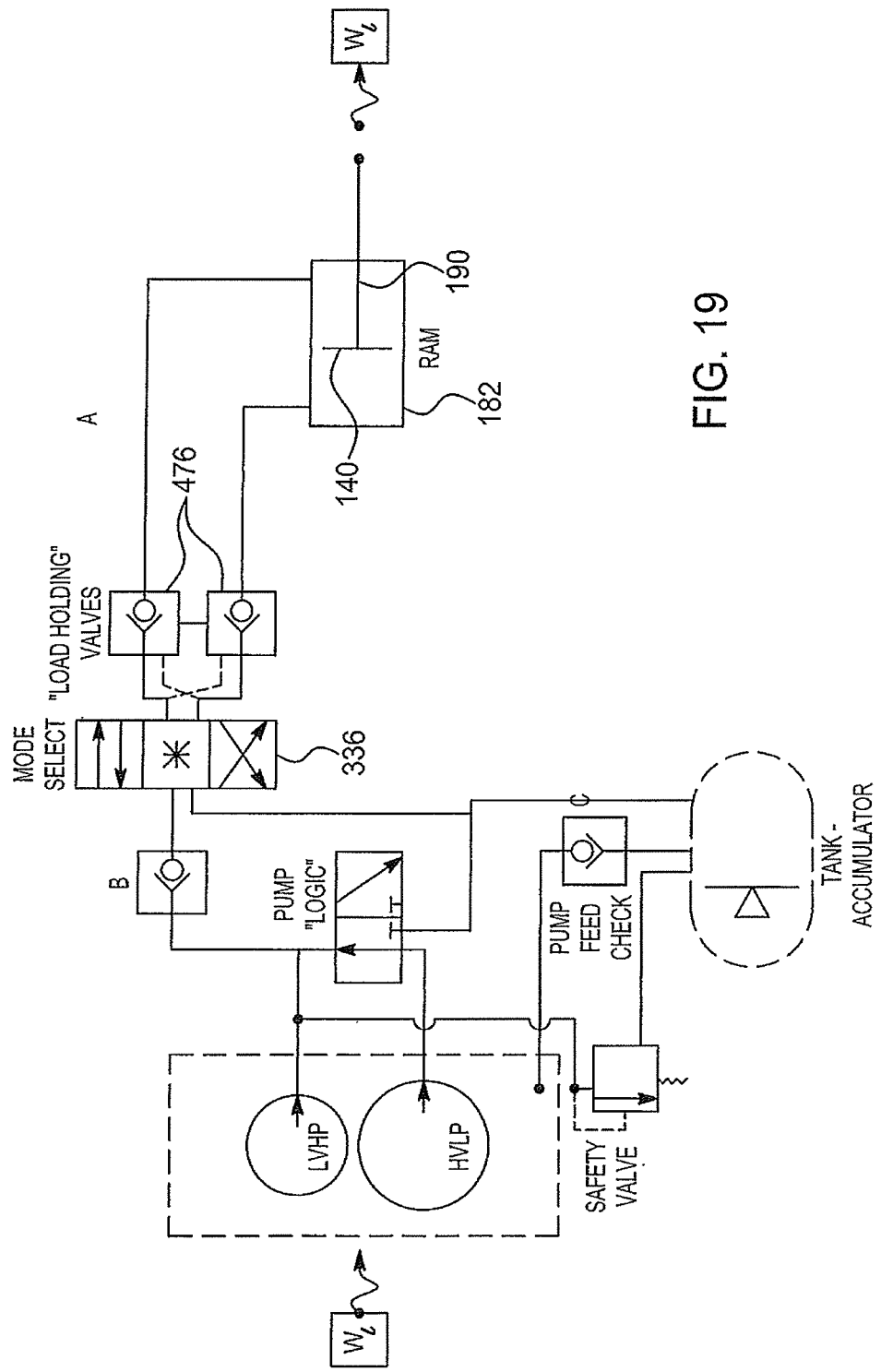
FIG. 19 is a schematic alternate fluid displacement system as shown in FIG. 13.

An example of the fluid displacement system 430 shown in FIGS. 14-18 is schematically shown in FIG. 19. As generally shown, valves "A" are fluid load holding check valves 476 described. Valves B and C are examples of locking fluid valves as to manage and control the selected flow of fluid as described above. Suitable other components, methods of routing fluid and operation may be used by those skilled in the art.

Referring to FIGS. 16 and 18, exemplary tool 300 preferably includes a toggle dial or switch 336 which, as generally described and illustrated in the first example 10, allows a user to rotate the dial 336 to select a mode of operation of whether the force arms will incrementally open, close or remain locked into position depending on the position of the dial 336.

Toggle dial 336 operably engages a fluid valve system which, as generally described above, permits the flow of fluid through predetermined fluid passageways toward an actuating cylinder, for example cylinder 182 and ram 186 and shown in FIG. 8, to move the force arms in the selected mode of operation. Toggle dial may use an activation ring 200 with contoured surface 202 and pockets 220 to operably open and close fluid valves for the appropriate mode of operation of toggle dial 336 as generally described. An alternate example of fluid valves and passageways usable in tools 10 and 300 are shown in FIG. 18. In place of the ball check-type fluid valves 176 and 178 explained in example tool 10 and illustrated in FIGS. 8 and 12, one or more larger fluid flow volume cartridge-style poppet-type fluid valves (generally shown as 476) (four shown) may be used with larger diameter fluid passageways or galleys 477 to increase the flow of fluid through the system and provide a more robust and fluid-sealed system with less resistance to the flow of fluid resulting in reduced efforts on the user in cycling actuator handle 340. A suitable fluid valve is a hydraulic check valve with threaded cartridge marketed by Parker as a Check Valve With Relief. Other types of valves, for example the previously discussed ball-check valves, and other fluid valves and systems known by those skilled in the art may be used.

As noted, tool 300 may include additional components and features described in the alternate tool example 10, as well as mix and match components and features, and visa versa without deviating from the present invention.

Figure 20:
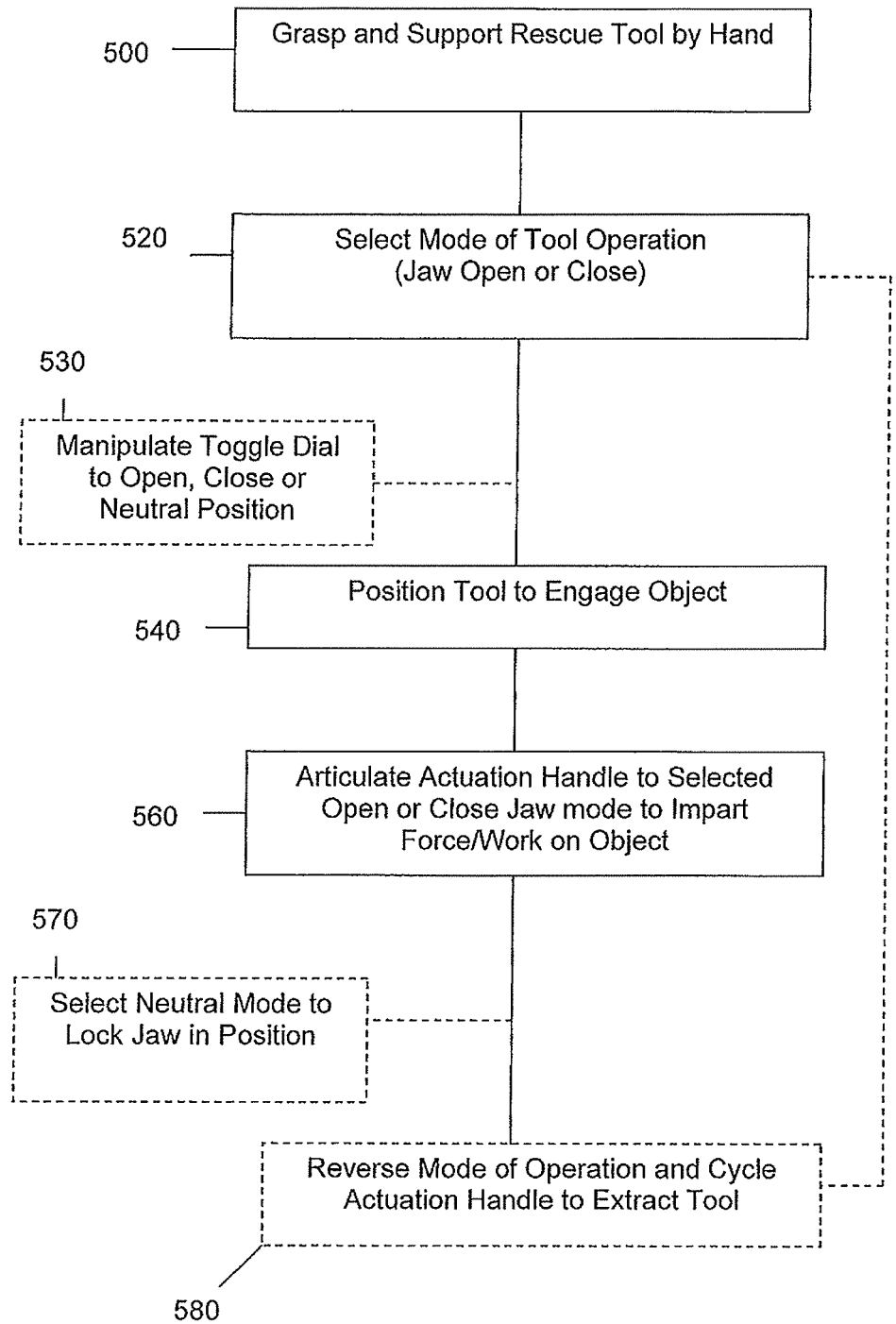
FIG. 20 is a flow chart of an example of a method of use of the rescue tool.

Referring to FIG. 20, a flow chart of exemplary steps in one use of rescue tool 10/300 is illustrated. In the example, for example to cut through a sheet metal structure in an emergency situation, the tool 10/300 would be manually grasped and supported by hand in step 500. Depending on the required use of the tool, step 520 includes the user determining the method of operation of the tool, typically whether the operation will require spreading or closing the jaw force arms on an object. This may be done through a step 530 of selectively manipulating the toggle dial 36/336 to the open, close or neutral position. In the exemplary cutting scenario, the jaws may first be set to the open position, the force members separated so that the object to be cut can be placed between the jaws in a step 540, then set to the closing mode to begin force cutting.

Once the tool 10/300 is set to the desired mode of operation and positioned to impart force or work on the object through the jaw force members, the user in step 560 manually cycles the actuation handle between the first and second positions to, in the described cutting example, close the jaw force members to cut or crush the object.

In exemplary and optional step 570, the toggle dial 36/336 may be set to neutral to lock the arms in place while, for example a person is extracted from a vehicle to maintain constant pressure on the object. This may be particularly useful where the tool is used to separate or lift an object to maintain the forced load on the object.

In an exemplary and final step 580, the movement of the jaw force members may need to be reversed to extract or forcibly disengage the force arms from the object to extract the tool. In this scenario, the toggle dial 36/336 would be manipulated to reverse the mode of operation and the actuation handle cycled to disengage the force members and extract the tool from the object. Other steps not expressly disclosed, as well as the order of the steps, may be added or vary depending on the particular application and use of the tool 10/300 as known by those skilled in the art.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A hand-held rescue tool for use in separating or cutting an object, the rescue tool comprising:
   a body having a longitudinal axis, a front end and a rear end along the axis;
   an actuating handle connected proximate the rear end of the body comprising a cam member pivotally connected to the body;
   a jaw connected proximate the front end of the body having a first force arm and a second force arm, at least one of the first and second force arms is angularly rotatable with respect to the body and the other force arm; and
   a fluid displacement system positioned in the body, the fluid displacement system having a piston connected to an angled slot in the cam member of the actuating handle and displaceable along the longitudinal axis for selective forceful movement of fluid to angularly displace the at least one rotatable force arm.

2. The rescue tool of claim 1 wherein the piston includes a clevis and pin extending from the body rear end toward the cam member, the clevis and pin engageable with the angled slot of the cam member for leveraged power transfer from the actuating handle to the piston.

3. The rescue tool of claim 2 wherein the actuating handle is selectively releasable and rotatable with respect to the body about the body longitudinal axis to maintain freedom of movement of the actuating handle through the angle of movement.

4. The rescue tool of claim 1 further comprising a support handle connected to the tool body positioned between the actuating handle and the jaw for supporting and positioning the rescue tool in an operative position.

5. The rescue tool of claim 4 wherein the support handle further comprises:
   a ring positioned circumferentially about at least a portion of the body longitudinal axis, and at least one side arm extending radially outward from the ring and connected to a hand grip portion, wherein the hand grip portion is selectively rotatable and engagable with the tool body about the longitudinal axis.

6. The rescue tool of claim 5 wherein the support handle further comprises a displaceable locking device selectively engageable with the tool body, the locking device having a button operable to selectively displace a locking member relative to the body, wherein on disengagement of the locking member from the body, the hand grip is freely rotatable about the body longitudinal axis and selectively re-engageable with the body to lock the hand grip in the desired position circumferential position with respect to the body.

7. The rescue tool of claim 1 wherein the first and the second force arms are respectively pivotally connected to the body at a first pivot point and selectively rotatable with respect to the body and the other force arm between a fully open position and a fully closed position, the fully closed position wherein a respective cutting edge of each force arm is in overlapping relation to a cutting edge of the other force arm.

8. The rescue tool of claim 7 wherein each force arm further comprises a second pivot point positioned radially inward toward the body longitudinal axis, the respective second pivot points are positioned in coaxial alignment and pivotally connected to a ram positioned in the tool body along the longitudinal axis, the ram selectively displaceable along the longitudinal axis in response to the fluid displacement system to simultaneously and incrementally rotate the first and second force arms in a selected direction toward a fully open position or a fully closed position.

9. The rescue tool of claim 1 wherein the fluid displacement system further comprises:
   a sealed piston cylinder defining a cavity housing the piston;
   a fluid reservoir in fluid communication with the sealed cylinder housing;
   an actuation cylinder positioned proximate the body first end adjacent the jaw in fluid communication with the piston cylinder;
   a first fluid path positioned between the piston cylinder and the actuating cylinder;
   a second fluid path positioned between the actuating cylinder and the reservoir; and
   a first fluid valve positioned in communication with the first fluid path and a second fluid valve positioned in communication with the second fluid path, the first and the second valves selectively operable to allow fluid to flow from one side of the respective valve to the other to selectively rotate the at least one force arm toward an open position or toward a closed position.

10. The rescue tool of claim 9 wherein the fluid reservoir further comprises a sealed bladder circumferentially positioned about the piston cylinder, the bladder in fluid communication with the piston cylinder, the second fluid path and the second fluid valve.

11. The rescue tool of claim 9 wherein the piston further comprises:
   a low volume piston positioned in the cylinder cavity; and
   a high volume piston positioned in the cylinder cavity in concentric relation to the low volume piston, wherein at least the high volume piston is operable at relatively low fluid pressure in response to low force resistance at the jaw to move a high volume of fluid and the low volume piston is operable at high fluid pressure in response to high force resistance at the jaw to move a low volume of fluid at high pressure to rotate the at least one force arm.

12. A hand-held rescue tool for use in separating or cutting an object, the rescue tool comprising:
   a body having a longitudinal axis, a front end and a rear end along the axis;
   an actuating handle connected proximate the rear end of the body;
   a jaw connected proximate the front end of the body having a first and a second force arm, at least one of the first and second force arms is angularly rotatable with respect to the body and the other force arm;
   a fluid displacement system positioned in the body, the fluid displacement system having a piston connected to the actuating handle and displaceable along the longitudinal axis for selective forceful movement of fluid to angularly displace the at least one rotatable force arm; and
   a toggle dial having a first position operable to select a first mode of operation wherein the at least one force member is forcibly rotated toward an open position on actuation of the fluid displacement system through cyclical articulation of the actuating handle and a second position operable to select a second mode of operation wherein the at least one force member is rotated toward a closed position on actuation of the fluid displacement system through cyclical articulation of the actuating handle.

13. The rescue tool of claim 12 wherein the toggle dial further comprises a toggle ring connected to the toggle dial and circumferentially positioned about the body longitudinal axis, the toggle ring having a first and a second cam surface, each cam surface in engagement with a respective fluid valve in communication with the fluid displacement system to selectively permit the flow of fluid from one side of the valve to the other.

14. The toggle dial of claim 12 further comprising a third position and third mode of operation wherein the at least one rotatable force arm is rotatably locked in position with respect to the body and other force arm.

15. A method of using a rescue tool for use in separating, cutting or lifting an object, the rescue tool having a body, a jaw connected to a first end of the body having a first jaw force arm and a second jaw force arm, an elongate actuating handle connected to a second end of the body, and a fluid displacement system in communication with the actuating handle and the jaw force arms operable to rotate at least one of the force arms relative to the body, the method comprising the steps of:
   selecting a mode of operation by rotating a toggle dial to one of an open mode of operation to allow angular separation of the first and second force arms, a closed mode of operation allowing angular closing of the first and second force arms, and a neutral mode of operation preventing angular movement of the first and the second force arms;
   selectively positioning the tool force arms to engage an object; and
   cyclically articulating the actuating handle between a first position and a second position to actuate the fluid displacement system to incrementally and progressively rotate at least one of the force arms toward or away from the other arm to forcibly do work on the object.

16. The method of claim 15 wherein the step of selectively positioning the tool force arms further comprises the step of grasping a support handle positioned between the actuating handle and the jaw with a hand to manually support and position the force arms to engage the object.

17. The method of claim 16 further comprising the step of rotatably adjusting the position of the support handle with respect to a longitudinal axis of the body to circumferentially position the support handle with respect to the body and the jaw to maximize a range of movement of the actuating handle between the first position and the second position.

18. The method of claim 15 further comprising the step of rotatably adjusting the actuating handle about a longitudinal axis of the tool body to circumferentially position the actuating handle with respect to the body and the jaw to maximize a range of movement of the actuating handle between the first position and the second position.

19. The method of claim 15 wherein the step of pivotally moving the actuating handle incrementally, progressively and simultaneously rotates both of the first and the second force arms with respect to the body and the opposing force arm.

20. The method of claim 15 wherein the step of pivotally moving the actuating handle further comprises the step of manually and repeated cycling of the actuating handle by hand between the first position and the second position to rotate the first and the second members with respect to the body.

* * * * *